US012657830B2

(12) United States Patent
Gao et al.

(10) Patent No.: US 12,657,830 B2
(45) Date of Patent: Jun. 16, 2026

(54) JOINT UV OPTIMIZATION AND TEXTURE BAKING

(71) Applicant: Tencent America LLC, Palo Alto, CA (US)

(72) Inventors: Xifeng Gao, Palo Alto, CA (US); Zherong Pan, Palo Alto, CA (US); Kui Wu, Palo Alto, CA (US); Julian Knodt, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 504 days.

(21) Appl. No.: 18/120,265

(22) Filed: Mar. 10, 2023

(65) Prior Publication Data

US 2024/0331299 A1 Oct. 3, 2024

(51) Int. Cl.
*G06T 17/20* (2006.01)
*G06T 15/04* (2011.01)

(52) U.S. Cl.
CPC ............ *G06T 17/205* (2013.01); *G06T 15/04* (2013.01); *G06T 2210/36* (2013.01)

(58) Field of Classification Search
CPC .... G06T 17/205; G06T 15/04; G06T 2210/36
See application file for complete search history.

(56) References Cited

U.S. PATENT DOCUMENTS

| | | |
|---|---|---|
| 2016/0314616 A1 | 10/2016 | Su |
| 2018/0330480 A1 | 11/2018 | Liu et al. |
| 2020/0184714 A1 | 6/2020 | Guo et al. |
| 2023/0044644 A1 | 2/2023 | Elbaz |

FOREIGN PATENT DOCUMENTS

| | | | | |
|---|---|---|---|---|
| DE | 102021130031 A1 * | 5/2022 | ............. | G06T 19/20 |
| WO | WO 2019150269 A1 | 8/2019 | | |
| WO | WO-2024191439 A1 * | 9/2024 | ............. | G06T 15/04 |

OTHER PUBLICATIONS

Julian Knodt et al., "Joint UV Optimization and Texture Baking", ACM Transactions on Graphics, vol. 43, Issue 1, Sep. 28, 2023, 4 pgs., Retrieved from the Internet: https://dl.acm.org/doi/pdf/10.1145/3617683.

Tencent Technology, ISRWO of 7870-WO, PCT/US2023/032775, Dec. 13, 2023, 6 pgs.

Tencent America, Extended European Search Report, EP Patent Application No. 23927806.2, Feb. 25, 2026, 7 pgs.

Jon Hasselgrenet al., "Appearance-Driven Automatic 3D Model Simplification", ARXIV.org, Apr. 2021, 19 pgs.

* cited by examiner

*Primary Examiner* — Chante E Harrison
(74) *Attorney, Agent, or Firm* — Morgan, Lewis & Bockius LLP

(57) ABSTRACT

A method of optimizing a simplified model associated with a high-poly model includes obtaining information about the simplified model; iteratively updating values of an initialized set of parameters of the simplified model to obtain optimized values; updating the initial set of vertices of a low-poly mesh with the optimized values; optimizing coordinates associated with the simplified model based on the optimized values of the initialized set of parameters; and baking texture from the high-poly model onto the optimized coordinates to generate the simplified model.

17 Claims, 12 Drawing Sheets

| Dataset | #Comp. | #Vertices | #Faces | Manifold | Genus | Holes |
|---|---|---|---|---|---|---|
| High-Poly | 8/225/2k | 502/8k/70k | 723/9k/0.1M | 5/26 | 0/0/0 | 0/29/174 |
| LOD-1 | 1/41/312 | 244/1k/5k | 306/1k/5k | 24/26 | 0/3/39 | 0 |
| LOD-2 | 1/19/82 | 43/354/1k | 64/406/1k | 26/26 | 0/2/28 | 0 |
| LOD-3 | 1/6/40 | 28/114/349 | 32/137/368 | 26/26 | 0/0/12 | 0 |

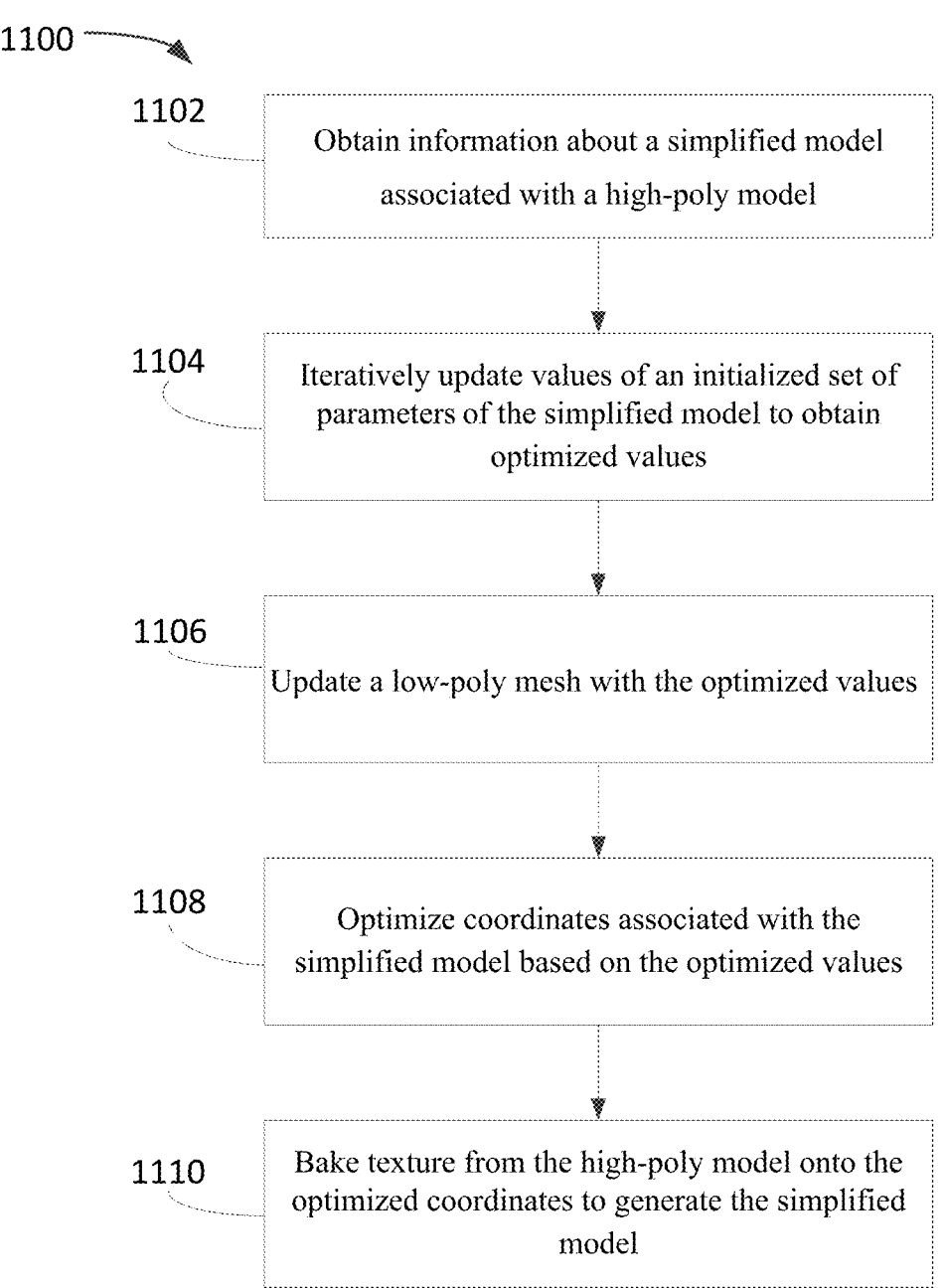

1102

Obtain information about a simplified model associated with a high-poly model

1104

Iteratively update values of an initialized set of parameters of the simplified model to obtain optimized values

1106

Update a low-poly mesh with the optimized values

1108

Optimize coordinates associated with the simplified model based on the optimized values

1110

Bake texture from the high-poly model onto the optimized coordinates to generate the simplified model

FIG. 11

JOINT UV OPTIMIZATION AND TEXTURE BAKING

TECHNICAL FIELD

This disclosure is directed to methods and systems for texture baking.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. There is a tradeoff between visual fidelity and high performance in interactive computer graphics. User demands for highly realistic content may involve rendering more polygons than what is affordable for both high-end and low-end platforms.

SUMMARY

An original high-poly model (e.g., created by an artist) may be a photorealistic high-fidelity graphic that includes a lot of detail, depth, shadow, texture and nuance of color that nearly replicates what is seen in the physical environment. In industrial 3D modeling pipelines, artists may create a high-poly model (hereinafter used interchangeably with "high-poly mesh") and rely on commercial software to generate low-poly counterparts (e.g., a low-poly model, hereinafter used interchangeably with "low-poly mesh") to replicate the appearance of the high-poly model. To provide a rendering method that is affordable for both high-end and low-end platforms, Level of detail (LOD) techniques may be used to render a low-poly model with fewer details when the model is small, distant, or unimportant, while rendering a high-resolution, detailed model (e.g., a high-poly model), when the viewer is close. A mesh may be composed of several polygons that describe the surface of a volumetric object. Its vertices in 3D space and the information of how the vertices are connected may define each polygon, referred to as connectivity information.

One approach is to first generate a low-poly mesh from its high-poly counterpart, then create a UV mapping for the low-poly mesh, and finally bake textures from the high-poly using commercial tools. Such an approach may generate unsatisfactory results that then require manual adjustment or intervention. For example, when texture baking and UV mapping are performed independently, the quality of a UV mapping is not taken into account during texture baking even though the results of texture baking may rely heavily on the outcome of UV mapping.

Without appearance-aware UV mappings, texels can be wasted on small or unimportant mesh regions, leaving salient regions ill-represented. Existing texture baking techniques may assume small geometric differences between the low-poly and high-poly models when it is often not the case in practice. With large geometric discrepancies, both ray-casting based texture baker and differentiable-rendering-based texture baker may suffer from view-parallax artifacts (e.g., strange copies from other parts of the model or blurry regions with unrecognizable features).

As a result, to achieve a satisfactory appearance of the low-poly model, the interwoven factors of the model including the geometry, the UV parameterization, and the texture map are to be considered. The methods and systems described herein provide an appearance baker that is robust to geometric differences between the low-poly model and the high-poly model. The methods and systems described herein use a visual difference metric to guide the joint optimization of the texture map and UV coordinates. By alternatingly updating the texture content and UV parameterization, the solution space for obtaining high visual quality may be effectively enlarged.

Further, the methods and systems described herein compensate for large geometric discrepancies using an optimized view parallax mapping. In some embodiments, Spherical Harmonic (SH) Parallax mapping uses a texture map formulated based on Spherical Harmonic (SH), hereinafter sometimes referred to as "SH texture map" or "SH map," to store coefficients for nonlinear Spherical Harmonic functions. The nonlinear Spherical Harmonic functions shift per-texel UV coordinates based on the view direction. The SH map is optimized jointly with the UV and texture maps to minimize the visual differences. In some embodiments, the introduced SH map may add only a marginal computational overhead to the rendering pipeline but may offer additional degrees of freedom that significantly improve visual similarity between the low-poly model and the high-poly model.

The methods and systems described herein may consistently deliver higher visual similarity at the same textures resolutions, in terms of both Peak Signal to Noise Ratio (PSNR) and multiscale structural similarity (MS-SSIM) metrics.

According to some embodiments, a method for optimizing a simplified model associated with a high-poly model (e.g., to improve visual similarity between the low-poly model and the high-poly model) may be provided. The method may be executed by at least one processor, and may include obtaining information about the simplified model; iteratively updating values of an initialized set of parameters of the simplified model to obtain optimized values; updating the initial set of vertices of a low-poly mesh with the optimized values; optimizing coordinates associated with the simplified model based on the optimized values of the initialized set of parameters and the UV parametrization; and baking texture from the high-poly model onto the optimized coordinates to generate the simplified model.

According to embodiments, an apparatus for optimizing a simplified model associated with a high-poly model (e.g., to improve visual similarity between the low-poly model and the high-poly model) may be provided. The device may include one or more processors; and memory storing one or more programs, the one or more programs comprising instructions that, when executed by the one or more processors, cause the one or more processors to perform operations including obtaining information about the simplified model; iteratively updating values of an initialized set of parameters of the simplified model to obtain optimized values; updating the initial set of vertices of a low-poly mesh with the optimized values; optimizing coordinates associated with the simplified model based on the optimized values of the initialized set of parameters and the UV parametrization; and baking texture from the high-poly model onto the optimized coordinates to generate the simplified model.

According to embodiments, a non-transitory computer-readable medium stores computer instructions may be provided. The instructions may include one or more instructions that, when executed by one or more processors of a device for sampling-based dynamic mesh compression, cause the one or more processors to determine one or more sample positions associated with an input mesh based on one or more sampling rate; determine an occupancy status associated respectively with each of the one or more sample positions, wherein the occupancy status indicates whether each of the one or more sample positions are within boundaries of one or more polygons defined by the input mesh; generate a sample-based occupancy map based on the occupancy status associated respectively with each of the one or more sample positions; and compress the sample-based occupancy map using a video codec into a plurality of single-channel or multiple-channel images.

BRIEF DESCRIPTION OF THE DRAWINGS

Further features, the nature, and various advantages of the disclosed subject matter will be more apparent from the following detailed description and the accompanying drawings in which:

FIG. 4 shows visual rendering of a mask model at different LODs, and a table showing various properties of the datasets, in accordance with some embodiments of the present disclosure.

FIG. 11 shows an example flowchart for obtaining a simplified model, in accordance with some embodiments of the present disclosure.

DETAILED DESCRIPTION

Figure 1:
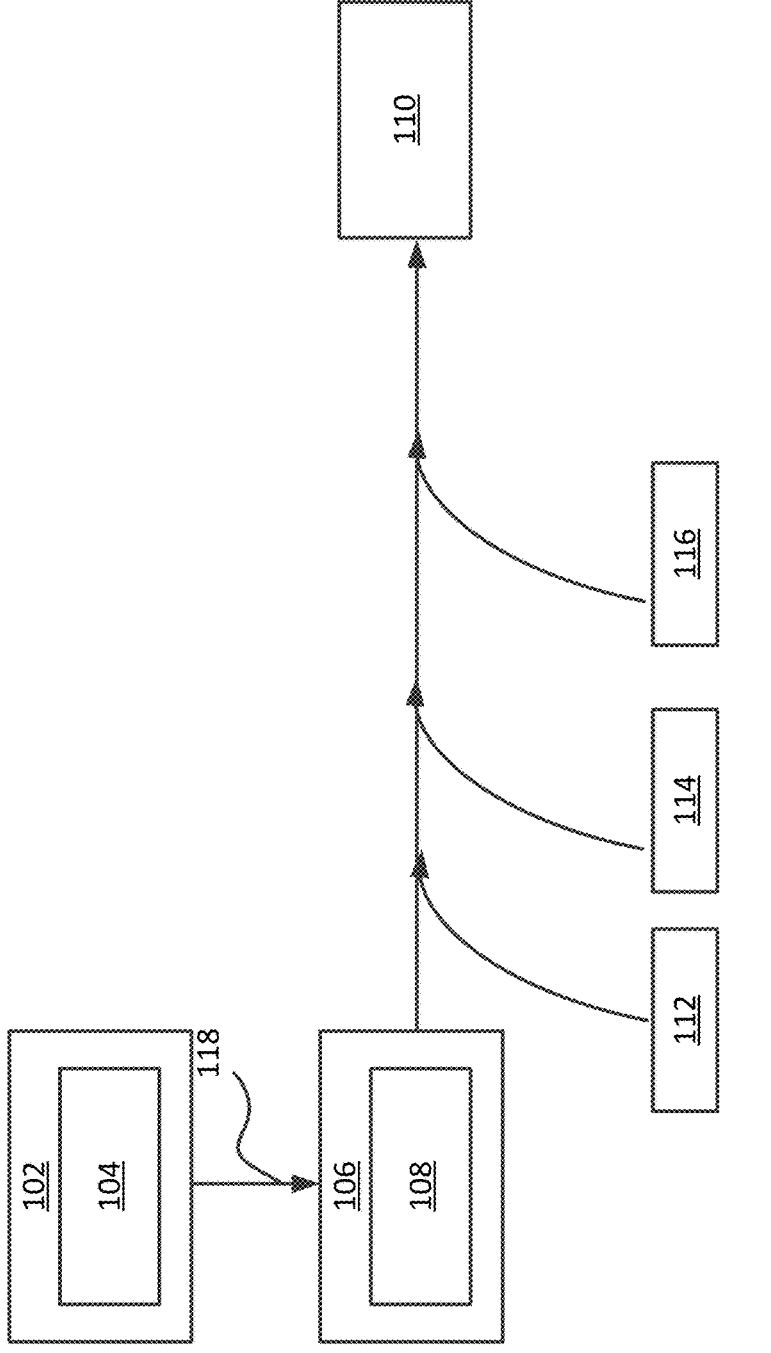
FIG. 1 is a schematic illustration of a simplified block diagram of a texture optimization process, in accordance with some embodiments of the present disclosure.

FIG. 1 shows a process 100 for optimizing a simplified model 110 associated with a high-poly model 102, in accordance with some embodiments. The high-poly model 102 may be created by an artist, and has known textures 104.

Given the high-poly model 102 with known textures 104 (e.g., from a high-poly model created by an artist) and an initial low-poly model 106 with an initial UV parameterization 108 but without any texture, the methods and systems described herein optimize UV texture coordinates and texture maps of initial low-poly model 106 to obtain a target low-poly model or simplified model 110, such that its expected visual appearance under all view directions may be as close to the high-poly model 102 as possible. The disclosed methods jointly optimize several parameters related to texture mapping in a UV and texture optimization step 112. In some embodiments, parallax mapping 114 is also included in the process, and vertex displacements optimization 116 is also used. The initial low-poly model 106 may be generated at different levels of details (LODs) via a process 118 (e.g., using Simploygon).

UV Parameterization

UV parameterization maps 2D textures to 3D meshes and influences the visual appearance of rendered objects. Given a mesh (e.g., from the high-poly model 102), generating a UV map typically involves three steps:

1) cutting open the mesh into one or more "charts", each of which can be flattened onto the 2D plane without introducing flips. For example, in some embodiments, the low-poly model or mesh $M \triangleq (V,E)$ is composed of a set of vertices $V \subset R^3$ (e.g., in 3D space) connected into a graph via edges E representing a triangulation. M is cut open along selected seam boundaries into a set of local charts that can be embedded into $R^2$ (e.g., a 2D plane). The low-poly mesh is mapped through a UV parameterization function $\psi$ to a planar mesh $M_P$, where: $M_P \triangleq (U,E)$ with $U \subset R^2$. Here $\psi$ is typically chosen as a bijective function such that $\psi(V)=U$ and $\psi$ is affine within each triangle;

2) UV distortion minimization of all charts, which may involve reshaping and moving each chart; and 3) packing optimized charts into an "atlas" according to texture resolutions selected by users.

The methods and systems described herein directly incorporate appearance attributes into the optimization process. In some embodiments, the disclosed methods focus on a visual metric for the whole model from a specific distance, without any assumption that the textures are constant throughout optimization. Rather, the disclosed methods jointly optimize both the texture content and the UV mapping to maximize a measured visual similarity.

Texture Baking

Ray-casting and Differentiable Rendering are two techniques that may be used for texture baking. In ray-casting, a ray for each surface texel of a low-poly model (having its UV layout, which may be an initial UV parameterization but without any texture) is cast along a normal direction of the respective surface texel for a high-poly model. Interpolated attributes at the intersection point between the ray and the high-poly model is computed, and ray-casting directly assigns the attribute to the texture of the low-poly model. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading. Ambiguity may happen for regions with significant geometric differences where multiple rays may intersect the high-poly model at the same position, producing a baked color map with numerous artifacts.

Differentiable rendering may resolve these artifacts by changing the problem to one involving a least-squares minimization of a visual similarity metric. In some embodiments, through auto-differentiation, attributes of a 3D scene can be automatically optimized by stochastic gradient descent to minimize visual metrics such as the &2 pixel-wise loss between a rendered image from the low-poly model and a rendered image from the high-poly model. Optimizing the texture while fixing a given UV parameterization of the low-poly model may result in textures (e.g., optimized textures) that are sub-optimal (e.g., a large number of texels is wasted on small or unimportant regions, which may not even be visible from a distant view). The methods disclosed herein jointly optimize UV and texture maps using differentiable rendering, leading to a much larger search space.

Bump Mapping

In interactive computer graphics, bump mapping refers to a collection of techniques representing small-scale geometry details, which enrich the geometric details of 3D models via pixel or texel perturbations. Normal mapping changes the geometry's normal to create fine shading details. Since normals typically do not create a strong illusion of depth, in some embodiments, parallax mapping is added to planar surfaces to add depth-parallax by shifting texture coordinates in the UV space, corresponding to the depth of elements.

Offset limiting may further reduce artifacts at steep angles. Steep parallax mapping can be introduced to perform multiple iterations of the UV shift by small steps, where a new depth is queried at each step of a ray-march through the depth map. Such ray-marching may stops when it is below the object surface and the method can either backtrack to the exact ray-object intersection point or linear interpolation may be used as an approximation. These approaches perform multiple texture queries, which may cause significant overhead. Further, such approaches may assume that the UV translation is always parallel to the original view direction, even when the UV parameterization has cuts and warps across triangular boundaries. Instead of modifying per-pixel attributes in the screen space, displacement mapping uses a height texture to displace vertices' positions in the vertex shader. While displacement mapping may be effective as a general-purpose method for recovering high-quality appearances, it may involve significantly more computations for subdividing the mesh to fit within each pixel to employ a geometry shader.

The methods and systems described herein use SH functions from irradiance environment maps to encode geometric details while reducing the number of texture fetches.

Rasterization Pipeline.

The final color I(p) of a pixel p at screen coordinates p=(x,y) in the forward rendering process is $$I(p) = \text{filter}(\text{shade}(d, C_p, N_p, \ldots))(p) \tag{1}$$

where the filter is used to sample the color at the pixel center p from the continuous screen coordinates p=(x, y) for antialiasing.

The shade function varies for different materials and takes several inputs, such as view direction d, color $C_p$, normal $N_P$ at p. In some embodiments, Lambertian shading is used:

$$\text{shade}(d, C_p, N_p) \triangleq (d \cdot N_p) \, Cp \tag{2}$$

In some embodiments, other bidirectional scattering distribution function (BSDF) models are used, for example, to optimize a mesh with a specular texture under stochastic lighting. In the rasterization-based rendering pipeline, any visible 3D point v can be rasterized on the 2D screen space along the view direction d via a rasterization function R such that p=R(v,d). Assuming R is locally invertible, given a view direction $d \in SO(3)$, each screen-space pixel p can be associated with a point $v = R^{-1}(p,d) \in R^3$ on the input mesh. Given the screen coordinate p, the visible surface color $C_p$ is defined as:

$$C_p \triangleq \text{fetch}(\psi \, (R^{-1}(p, d)), Tc) \tag{3}$$

where $T_C$ is a texture for the color map, and the fetch function provides texture data by interpolating neighboring texels. Similarly, normal $N_P \triangleq \text{fetch}(\psi(R^{-1}(p, d)), T_N)$ with $T_N$ being the texture for the normal map.

Differentiable Rendering

In some embodiments, texture ambiguity in texture baking may be resolved in a least-square sense. Differentiable rendering identifies $T_C$ and $T_N$ as the minimizer of the following expected visual similarity metric among all view directions:

$$\underset{T_C, T_N}{\text{argmin}} \; \underset{d \in SO(3)}{\mathbb{E}} \left[ \int_S \mathcal{L}_{diff}(p, d) dp \right]$$

$$\mathcal{L}_{diff}(p, d) \triangleq \|I(p, d, T_C, T_N) - I(p, d, T'_C, T'_N)\|,$$

where S is the screen space and $T'_C$, $T'_N$ are the textures of the ground truth high-poly model. $I(p,d,T'_C,T'_N)$ is the rendering function of the high-poly model. In some embodiments, if a 3D point v is occluded, then p=R(v, d) is undefined and $I(p,d,T_C,T_N)=I(p,d,T'_C,T'_N)$. Existing differentiable rendering frameworks which only consider optimizing the texture while fixing the given UV parameterization may waste a large number of texels on small or unimportant portions.

In some embodiments, the methods and systems described herein unify the two approaches of distortion-minimizing and content-aware UV parameterization, using differentiable rendering. In some embodiments, the methods and systems further optimize a view-parallax mapping to compensate for potentially large geometric differences between the two meshes (e.g., the high-poly mesh and the low-poly mesh).

In some embodiments, UV parameterization $\psi$ may play an important role in high-quality texture baking. In some embodiments, for distortion-minimization algorithms, $\psi$ should be as isometric as possible (e.g., $\Delta\psi$ is as close to identical as possible). In some embodiments, $\psi$ may be globally bijective, preventing different 3D points from being ambiguously mapped to the same UV coordinate. In some embodiments, $\psi$ is content-aware such that $\psi$ assigns larger areas to $T_C$ with "richer" color information. Such a content-aware approach may involve inherent difficulty in measuring the texture information entropy.

With the growth of differentiable rendering, measures of visual similarity, $L_{diff}$, may serve as ideal candidates for content complexity measures in some embodiments. The approach described herein jointly optimize UV coordinates U and texture color/normal maps $T_C, T_N$. In some embodiments, the augmented optimization problem may take the following form:

$$\underset{T_N, T_C, U}{\text{argmin}} \; \underset{d \in SO(3)}{\mathbb{E}} \; [\mathcal{L}_{diff}] + \lambda_{I \circ UV} \underset{d \in SO(3)}{\mathbb{E}} \; [\mathcal{L}_{I \circ UV}]$$

s.t. $\psi$ is bijective. In some embodiments, $L_{diff}$ plays a guiding role that provides content to $T_N, T_C$, and $L_{I-UV}$ makes UV coordinates U content aware. $\lambda_{I-UV}$ denotes a weight coefficient.

Figure 2:
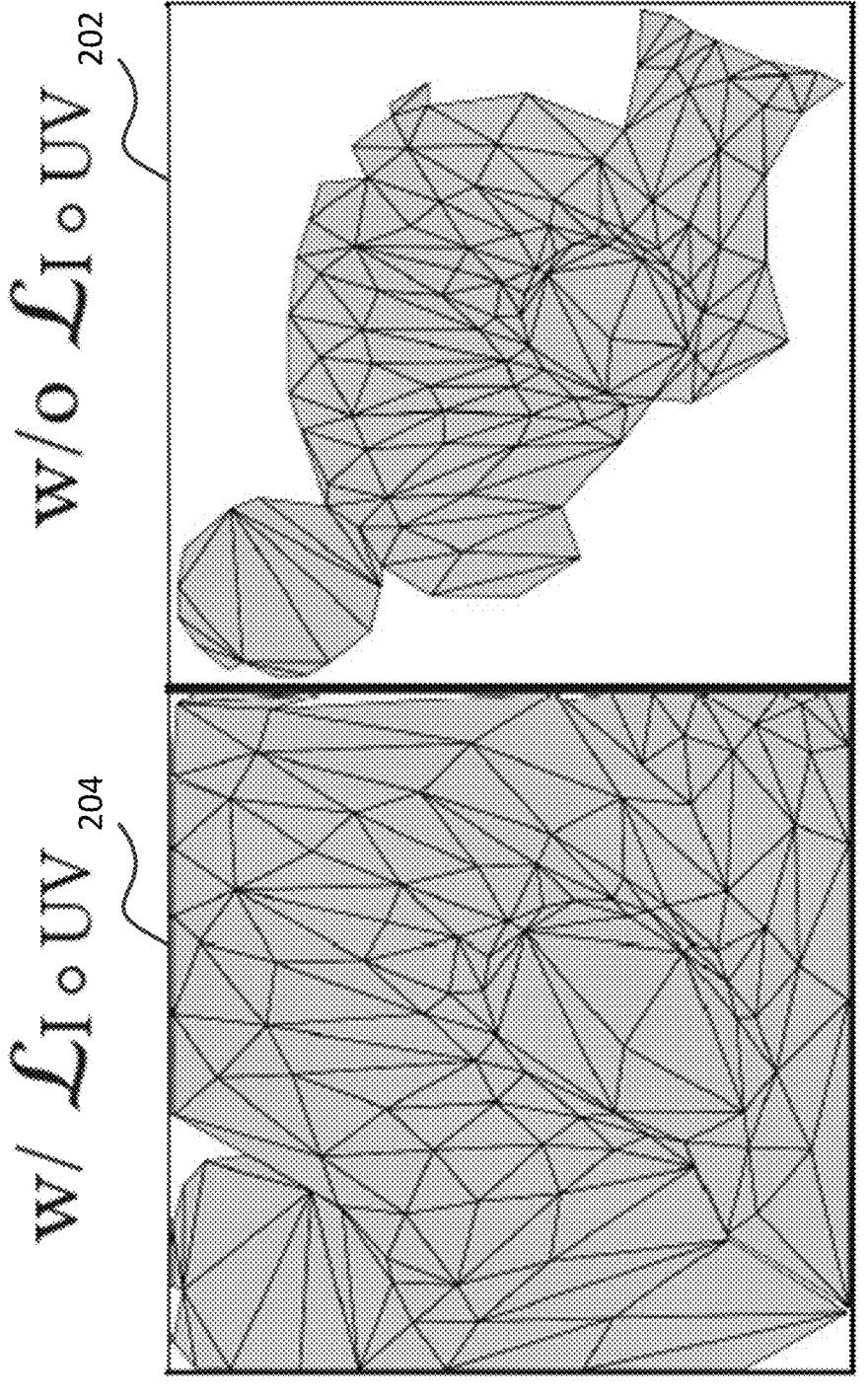
FIG. 2 is an example illustrating an optimized output that is not content-aware and an optimized texture that is content-aware, in accordance with some embodiments of the present disclosure.

Optimization performed without the content-aware term may not provide sufficient gradient information to make the optimized texture content-aware. FIG. 2 shows a final UV map 202 that is obtained without a content-aware term, and an optimized final UV map 204 using the approach described herein that includes the content-aware term, which provides sufficient gradient information to make the optimized texture content-aware.

In some embodiments, multiplicative, content-aware image-based symmetric Dirichlet energy $L_{I-UV}$ may provide advantages over the use of $L_{diff}$ alone, which may not provide sufficient gradient information to recover content-aware UV coordinates, and $L_{I-UV}$ may be formulated as:

$$\mathcal{L}_{I \circ UV}(d) \triangleq \int_M \left[ \|\nabla \psi(v)\|^2 + \|\nabla \psi^{-1}(v)\|^2 \right] \mathcal{L}_{diff}(R(v, d), d) dv,$$

where $L_{diff}(R(v,d),d)=0$ for invisible, occluded v. $\|\nabla\psi(v)\|^2 + \|\nabla\psi^{-1}(v)\|^2$ is the symmetric Dirichlet energy that penalizes deviations of $\nabla\psi$ from identity and helps prevent $\psi$ from producing local inversions. In some embodiments, in practice, the integral over the mesh surface M is a summation of triangles if linear shape functions are used in discretization, and v can be any point on M. Further, because $\psi$ is bijective, $\psi^{-1}$ is also well-defined.

In some embodiments, the original symmetric Dirichlet energy may not be content-aware by itself. By multiplying with $L_{diff}(R(v,d),d)$, $L_{I-UV}$ imposes a higher distortion penalty if the surface point v induces a larger visual dissimilarity. Thus, $L_{I-UV}$ becomes a content-aware UV mapping regularizer. $L_{diff}$ is a per-pixel measure, whereas the symmetric Dirichlet energy is a per-triangle measure.

In some embodiments, to unify distortion-minimizing and content-aware UV parameterization, $L_{I-UV}$ is evaluated as a summation over triangles. For each triangle, a screen-space measure of the integral of $L_{diff}(R(v,d),d)$ is computed. The visual similarity loss contributed by the given triangle is computed using rasterization, as in NVDiffmodeling.

In some embodiments, if some v is occluded from d, then $L_{diff}=0$, which may cause the triangle containing v to easily flip or become degenerate. In some embodiments, the original symmetric Dirichlet energy $L_{uv}$ is added with the weight $\lambda_{uv}$ to the objective to bias towards a distortion-minimizing $\psi$ to avoid this degenerate solution:

$$\mathcal{L}_{uv} \triangleq \int_M \|\nabla\psi(v)\|^2 + \|\nabla\psi^{-1}(v)\|^2 dv.$$

$L_{I-UV}$ and $L_{uv}$ may be useful in different scenarios. In some embodiments, $L_{I-UV}$ increases quality in a content-aware sense. In some embodiments, $L_{uv}$ ensures a minimum baseline isometric quality for $\psi$. In some embodiments, where geometric distortion is less important, $\lambda_{I-UV}$ is chosen to be much larger than $\lambda_{uv}$.

In some embodiments, for $\psi$ to be bijective, UV mesh $M_P$ is to be free of intersections. A first type of approaches, that includes scaffolding approaches, triangulate the ambient space of $M_P$ in UV space and transforms the constraint into locally injective symmetric Dirichlet regularizations for both internal and ambient triangles. A second type of approaches, what includes the primal interior point method such as the interior potential function, formulates a barrier function bounding the distance between any $v_0$, $v_1 \in \partial M_P$ away from zero. In some embodiments, the second type of approach is used and the constraint is transformed into the following barrier term:

$$\mathcal{L}_{IPC} \triangleq - \sum_{\substack{v_a \neq v_b, v_a \neq v_c \\ v_a, v_b, v_c \in \partial T, \partial M_P \\ <v_b, v_c> \in E}} \text{clog}(dist(v_a, v_b, v_c))$$

$$\text{clog}(x) \triangleq \max\left(-(x - d_0)^2 \log(x/d_0), 0\right),$$

where T represents the rectangle texture space, $L_{IPC}$ is a sum of the barrier distance function, dist(•), over all the vertex-edge pairs on $\partial T \cup \partial M_P$ and $d_0$ is an activation distance for efficiently pruning faraway geometric pairs from computation. Intersections between $\partial M_P$ and $\partial T$ are avoided in order to constrain the UV mesh to remain inside the texture space T. The IPC energy allows bijectivity to be imposed without incurring additional memory and computational cost of storing and re-triangulating a scaffolding mesh. Adding a distance do separates different charts by a distance of several texel widths, ensuring enough texels for constructing independent interpolation stencils for neighboring charts. This reduces seam artifacts on the resulting model.

Spherical Harmonic Parallax Mapping

When geometric discrepancies between the low-poly model and the high-poly model (or mesh) are large, optimizing UV parameterization may lead to large UV regions being allocated to mismatched surfaces. This may exacerbate blurriness in regions with high geometric differences, leading to an even worse final quality. In some embodiments, SH parallax mapping is built to reduce the influence of geometric discrepancy, where the texture mapping function is formulated as:

$$C(v) = \text{fetch}\left(\psi(v) + \frac{\text{fetch}(\psi(v), T_D)}{d_{tangent(z)}} \phi_{SH}(\psi(v), d), T_C\right), \quad (4)$$

where $d_{tangent(z)}$ is the tangent space viewing direction's z coordinate, $T_D$ is a scalar depth map, and the SH-based UV coordinate shift function $\phi_{SH}$ is defined as:

$$\phi_{SH}(t, d) = \sum_{\substack{l=0, o \\ m=-l, l}} \text{fetch}(t, T_{l,m}) Y_l^m(d), \quad (5)$$

where t is the UV coordinates, $$Y_l^m$$

is the real Legendre polynomial of order l, and $T_{l,m}$ is the texture storing the corresponding coefficients.

In some embodiments, all coefficients are stored in one multi-channel texture so that a single texture lookup fetches all the coefficients. In some embodiments, the UV coordinate bias function unlocks a larger solution space, leading to higher visual similarity, and the computational cost of deploying equation (5) in a forward renderer may be marginal when using low-order SH functions.

Instead of utilizing SH in irradiance mapping that directly computes the coefficients, the methods and systems disclosed herein optimize coefficients through auto-differentiation of the forward rendering pass with integrated SH parallax mapping.

Vertex Displacements Optimization

As the level of details decrease, the silhouette mismatch between the high-poly and low-poly may deteriorate in a way that may not be mitigated by any texture-based approach. In some embodiments, vertex displacements are additionally optimized to tackle this issue. In some embodiments, in addition to using parallax mapping, constrained optimization of low-poly mesh vertices further improves the silhouette mismatch (e.g., reduces the silhouette mismatch) between the low-poly and high-poly meshes.

Differentiable rendering techniques that perturb the vertex coordinates permanently at each iteration using a Laplacian smoothness term may cause low-poly meshes to deform in ways that do not minimize silhouette differences. The methods and systems described herein allow low-poly vertices to be perturbed only along their normal directions fetched from the normal map, and the amount of perturbations are additional optimization variables denoted as $\delta \in R$. In other words, in some embodiments, the methods and systems described herein displace vertices of the low-poly model after the optimization procedure, moving $v_i \in V$ to $v_i + \delta_i n_i$, where all $\delta_i$ are assembled in a vector $\Delta V$. In some embodiments, vertex optimization strategy leads to higher-quality results compared to the use of (e.g., only) Laplacian smoothing.

Optimization Techniques

In some embodiments, the optimization takes the following unconstrained form:

$$\underset{T_N, T_C, T_D, T_{l,m}, \Delta V, U}{\mathrm{argmin}} \mathcal{L} \triangleq \tag{6}$$

$$\mathbb{E}_{d \in SO(3)} \left[ \mathcal{L}_{diff} \right] + \lambda_{uv} \mathcal{L}_{uv} + \lambda_{I \circ UV} \mathbb{E}_{d \in SO(3)} \left[ \mathcal{L}_{I \circ UV} \right] + \lambda_{IPC} \mathcal{L}_{IPC},$$

where $\lambda \cdot$ denotes a weight coefficient for the corresponding energy term.

The original Adam optimizer in the differentiable rendering framework may not be suitable for UV optimization, in some cases. For example, UV optimization may involve non-Lipschitz barrier energy with a non-trivial feasible domain which, once exited may be hard to return to. The use of a constant or shrinking learning rate could potentially leave the feasible domain of these functions. Second, some functions may be much more costly to compute than others. For example, in some embodiments, evaluating the $L_{diff}$ term may only involve efficient rasterization-based rendering, but the $L_{IPC}$ term may involve costly geometric proximity querying, which scales with the number of vertices. In some embodiments, the methods and systems described herein may provide a feasibility guaranteed alternating multi-stage optimizer, as detailed below.

Line-Search Safety Guarantee

Given the unconstrained optimization, the UV mapping function, $\psi$, could be non-bijective since $L_{uv}$ and $L_{IPC}$ may only be soft penalty terms to encourage $M_P$ to stay away from producing triangle flips and intersections. In some embodiments, a line-search step is added to keep $\psi$ in the feasible domain. In some embodiments, the methods and systems described herein first estimate the largest step size $\alpha_0$ and then find a suitable final step size $\alpha$ that satisfies the first Wolfe condition.

To keep $L_{uv}$ and $L_{I \cdot UV}$ well-defined, in some embodiments, $\alpha_0$ is computed to be the largest value such that the minimal singular value $\sigma_{min}(\Delta\psi) \geq 0$, or the point at which triangle inversion would occur. In some embodiments, this is computed by solving a quadratic equation per triangle in parallel.

To ensure that $M_P$ and T remain intersection-free, the methods and systems described herein compute $\alpha_1$, the time-of-impact where a vertex-edge pair on $\partial T \cup \partial M_P$ intersects. In some embodiments, the final $\alpha$ is defined as $\alpha \triangleq \min(\alpha_0, \alpha_1)$.

UV and Texture Initialization

Since the methods and systems described herein use a bijective initialization for the UV coordinates U, in some embodiments, xatlas is used to generate an initial bijective mapping. The methods and systems described herein also perform a normalization step of the initial UV parameterization, such that it is centered and fills the 2D bounding box (e.g., $[0.01, 0.99]^2$), to ensure that the UV mesh has space to deform. In some embodiments, the texture colors are initialized as gray, tangent normal values are set to [0, 0, 1], and Spherical Harmonic coefficients are set to a small uniformly random value.

Alternating Optimization

In some embodiments, after initialization, the algorithm alternatingly updates the textures and UV coordinates to achieve joint optimality. The algorithm first fixes the UV coordinates U and update all the textures, $T_N$, $T_C$, $T_D$, $T_{l,m}$, $\Delta V$, using $k_0$ iterations of Adam with batch-sampled approximations of the rendering loss over view directions $d \in SO(3)$. Such an approach may give a good initial estimate of the spatially varying weight of the symmetric Dirichlet texture regularization term $L_{I \cdot UV}$. The algorithm then uses $k_1$ total iterations of f steps with Adam optimizer for the textures and one iteration of limited-memory Broyden-Fletcher-Goldfarb-Shanno algorithm (L-BFGS) with line-search for UV coordinates. The gradient information of these two sets of variables is coupled, but when updating the UV coordinates, the computational bottleneck may be the re-rasterizing to compute visual differences. Specifically, the gradient of the spatially adaptive symmetric Dirichlet term takes the following form:

$$\nabla \mathcal{L}_{I \circ UV} = \int_M \nabla \left[ \|\nabla\psi(v)\|^2 + \|\nabla\psi^{-1}(v)\|^2 \right] \mathcal{L}_{diff}(R(v, d), d) dv +$$

$$\int_M \left[ \|\nabla\psi(v)\|^2 + \|\nabla\psi^{-1}(v)\|^2 \right] \nabla \mathcal{L}_{diff}(R(v, d), d) dv,$$

During line search, re-evaluation of $L_{diff}$ would involve re-rasterization of the mesh. In some embodiments, $L_{diff}$ is fixed during line-search, saving computational resources. In some embodiments, the alternating optimization is terminated after a fixed iteration budget is reached or the gradient of the UV vertices and the change in diffuse texture is below a certain threshold. After this, the texture and UV coordinates may be approximately jointly optimal. Thereafter, another $k_2$ iterations of Adam optimization is used to fine-tune textures, which can also be terminated early if textures have converged.

In some embodiments, Algorithm 1 showed below is used as an alternative optimizer for Equation 6. Algorithm 1 receives as input $k_0$, f, $k_1$, $k_2$, $k_3$, $\epsilon_0$, $\epsilon_1$, initial U and V, and outputs $T_N$ (the texture for the normal map), $T_C$ (the texture for the color map), $T_D$ (texture for the scalar depth map), $T_{l,m}$ (texture storing the corresponding coefficients $$Y_l^m$$

for the real Legendre polynomial of order l), U (positions on a planar mesh $M_P$, $U \subset R^2$), and V (set of vertices, $V \subset R^3$, and the UV parameterization function $\psi$ maps the vertices into a plane ($\psi$)=U)).

Input: $k_0$, f, $k_1$, $k_2$, $k_3$, $\epsilon_0$, $\epsilon_1$, initial U and V
Output: $T_N$, $T_C$, $T_D$, $T_{l,m}$, U, V
1: Initialize $T_N$ by setting all normals to (0, 0, 1)
2: Initialize $T_C$ by setting all colors to gray (0.5, 0.5, 0.5)
3: Initialize $T_D$ as 0
4: Initialize $T_{l,m} \sim U$ ($-\epsilon_0$, $\epsilon_0$)
5: Use $k_0$ iterations of Adam to update $T_N$, $T_C$, $T_D$, $T_{l,m}$, $\Delta V$
6: while $\Delta \|T_N\|$, $\Delta \|T_C\| > \epsilon_1$ and iters<$k_1$ do
7: Use f iterations of Adam to update $T_N$, $T_C$, $T_D$, $T_{l,m}$, $\Delta V$
8: Use 1 iteration of L-BFGS with line search to update U
9: Use $k_2$ iterations of Adam to fine-tune $T_N$, $T_C$, $T_D$, $T_{l,m}$, $\Delta V$
10: Set V=V+$\Delta V$
11: Return $T_N$, $T_C$, $T_D$, $T_{l,m}$, U, V
Implementation Details In some embodiments, the algorithm is implemented in Python, using NVDiffrast with CUDA for numerical computations and differentiable rendering.

Texture Padding and Scaling

In some embodiments, $d_0$ in $L_{IPC}$ imposes a padding distance between neighboring charts, which ensures charts are far enough apart for texture interpolation. In some embodiments, $d_0$ is set to 5$\Delta t$, where $\Delta t$ is the texel width. In some embodiments, the low-poly model and the high-poly may have drastically different UV mapping functions $\psi$. In some embodiments, the methods and systems described herein may perform best when the two mapping functions $\psi$ contain the same number of texels. To approximately implement (e.g., enforce) this feature, the methods and systems described herein scale the UV coordinates relative to texture resolution to ensure the low-poly model and high-poly model take up the same number of texels in the UV space and the scaling is not recalculate during optimization.

Numerical Stability.

In some embodiments, the use of automatic differentiation for computing the gradients may introduce numerical issues. Automatic differentiation may involve additional treatment for numerical stability of non-Lipschitz barrier energy terms. First, for the symmetric Dirichlet function, in some embodiments, $\psi$(v) is set to $\psi$(v)=exp(log($\psi$(v))), to induce better numerical stability. Such an approach may be particularly useful when computing the UV texture area, which is bounded and may be close to zero.

As edges and points get close (e.g., extremely close), boundary computation may quickly consume floating point precision. In some embodiments, a mixed precision scheme may help to remedy the issue by computing all gradients using 32-bit floats to save hardware bandwidths while switching to 64-bit floats to compute boundary edge-vertex overlaps, which do not involve gradients.

Parameter Settings.

In some embodiments, for the number of iterations, a budget of $k_0$ of between 300-800, or 400-600, or about 500 is set. $k_1$ may be between 500-1200, 700-1000, or about 800, f may be between 3-10, or about 5, and $k_2$ may be between 300-800, or 400-600, or about 500. In some embodiments, 500 iterations may often be enough to approximate the output of NVDiffmodeling initially, and clean up any artifacts caused by shifting UV coordinates. In some embodiments, SH coefficients are initialized uniformly by setting $\epsilon_0$ between $1\times10^{-7}$ to $1\times10^{-3}$, for example $1\times10^{-5}$, to avoid any effects of Spherical Harmonics as the initialization. $\epsilon_1$ is set to be between $1\times10^{-8}$ to $1\times10^{-4}$ for example, $1\times10^{-6}$. For weights on loss terms, $\lambda_{UV}$ is set to be between $1\times10^{-4}$ to $1\times10$ for example, $=1\times 10^{-2}$, $\lambda_{IPC}$ is set to be between $1\times10^{-4}$ to $1\times10$ for example, 1, and $\lambda_{r,UV}$ is set to be between $1\times 10^{-4}$ to $1\times10$ for example, 5. In some embodiments, third order SHs provide a good balance between efficiency and representability.

The input meshes with 2D UV atlases may have vertices, where each vertex of the mesh may have an associated UV coordinates on the 2D atlas. The occupancy, geometry, and attribute maps may be generated by sampling one or more points/positions on the UV atlas. For each occupied sample, one can calculate its corresponding 3D geometry coordinates and attributes by interpolating from the associated polygon vertices.

In some embodiments, the approach described herein may be implemented on a workstation with an 8-core Intel processor clocked at 2.5 GHZ, 64 GB of memory, and a single NVIDIA Titan XP GPU with 12 GB of RAM, where most computations are performed on the GPU and in a single CPU thread.

In some embodiments, the generated textures are evaluated by sampling a set of 48 camera views uniformly spaced on a sphere of radius 2 centered around the model, which is resized into the unit box [−1, 1]. In some embodiments, visual similarity may be compared using both PSNR and MS-SSIM, where higher values for both metrics indicate better performance. In some embodiments, the diffuse color and normal textures for all the variations of the described approach are optimized. For example, the following notations are used:

"$Ours_{UV}$" denotes the optimization of $T_C$, $T_N$, and U;
"$Ours_{SH}$" denotes the optimization of $T_C$, $T_N$, $T_D$, and $T_{l,m}$;
"$Ours_{SV}$" denotes the optimization of $T_C$, $T_N$, and $\Delta V$;
"$Ours_{UV,SH}$" denotes the optimization of $T_C$, $T_N$,U,$T_D$, and $T_{l,m}$; and
"Ours" denotes the optimization of all variables described in Algorithm 1.

Dataset

A dataset of 3D models found in the wild was used to generate a set of LOD models. High-poly meshes of a set of 3D models were collected from Sketchfab and converted each of them into a mesh with a single UV atlas $\in [0, 1]^2$ and a $2048^2$ texture using xatlas for parameterization and Blender for texture transfer. For each high-poly mesh, 3 low-poly meshes were generated with varying geometric differences from the reference mesh using Simplygon.

Figure 3:
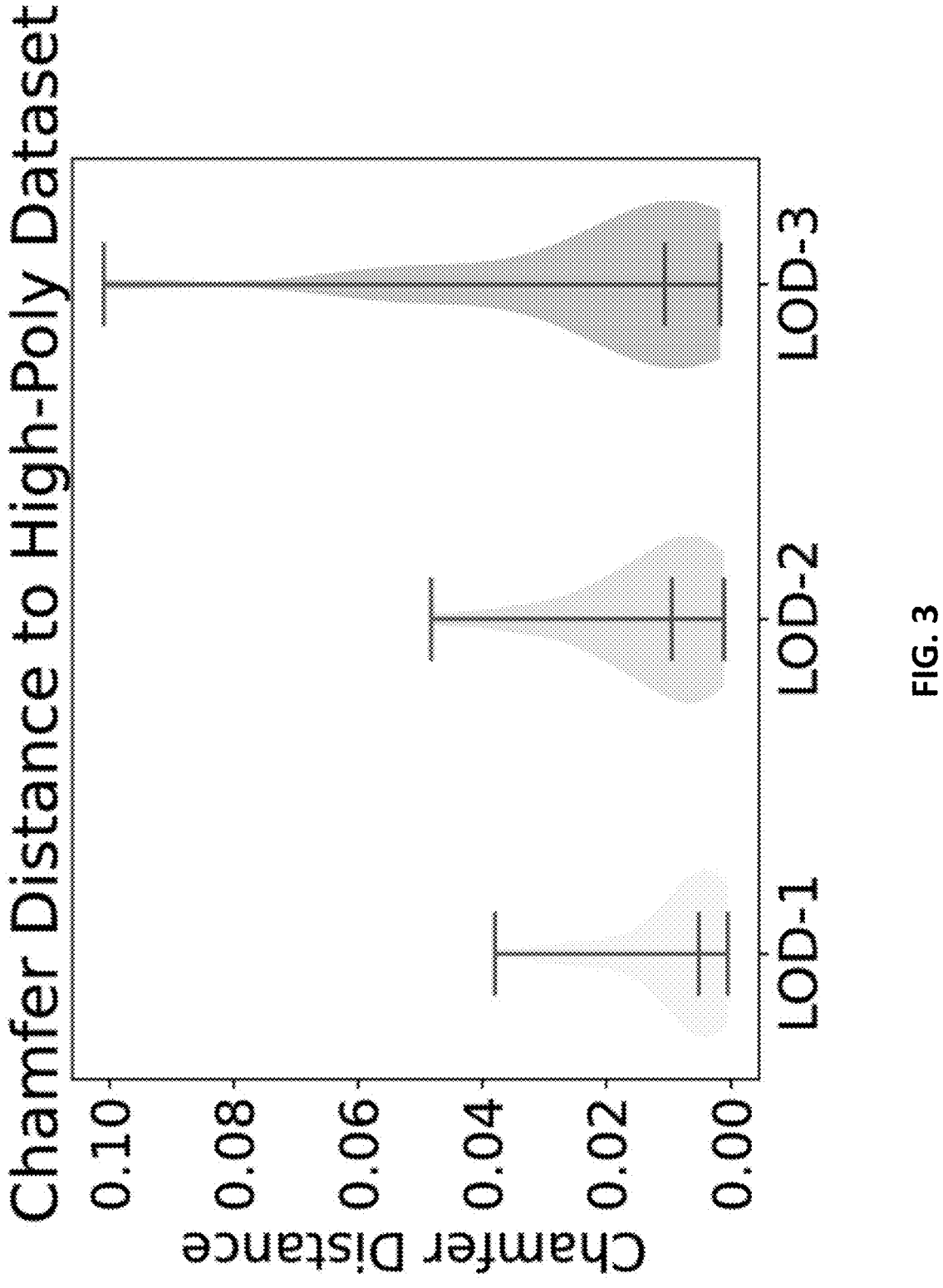
FIG. 3 shows Chamfer distance statistics between LOD datasets and the high-poly meshes, in accordance with some embodiments of the present disclosure.

FIG. 3 shows Chamfer distance statistics between the LOD datasets and the high-poly meshes. For the computation of Chamfer distance, each mesh was centered at the origin and resized to fit in the unit box. When generating meshes using Simplygon, the screen-size parameters were set to 50, 100, and 300, corresponding to large, moderate, and small geometry differences, and denoted as LOD-3, LOD-2, and LOD-1, respectively.

Screen-size roughly corresponds to the mesh resolution, where lower values will lead to coarser approximations with fewer vertices and faces. The UV parameterization that Simplygon generates alongside the produced meshes was used. While the set of high-poly meshes has a broad variety of shapes, geometric complexities, and texture qualities, the low-polys have dramatically different geometry and topology properties from their high-poly counterparts. FIG. 4 shows a table that includes the minimum/median/maximum of different properties of the dataset, including the number of components (#Comp.), the number of vertices and faces, the number of manifold meshes/the total number of models, the genus, and the number of holes contained in the models. A high-poly mask 402 includes 4082 faces, a LOD-1 mask 404 includes 1726 faces and has a Chamfer distance of 0.0031, a LOD-2 mask 406 includes 522 faces and has a Chamfer distance of 0.0062, and the LOD-3 mask 408 includes 218 faces (one of which is shown as a face 410), and has a Chamfer distance of 0.0083.

Comparisons with Competing Texture Bakers. The approach described herein is compared with (1) open-source ray-casting approach in Blender, (2) the texture baker in Unreal Engine (UE), and (3) the differentiable rendering approach in NVDiffModeling. The same configuration and settings for all meshes were used in the various comparisons. For Blender, the default setting for cage extrusion without additional resizing was used. For UE, the ray offset distance from the surface is set to be large ($1 \times 10^5$), as UE does not automatically rescale meshes before texture baking and operates in world space. For the evaluation, three LOD datasets were generated from Simplygon and new diffuse and normal textures with resolutions at $512^2$, $256^2$, and $128^2$ were produced.

Figure 6:
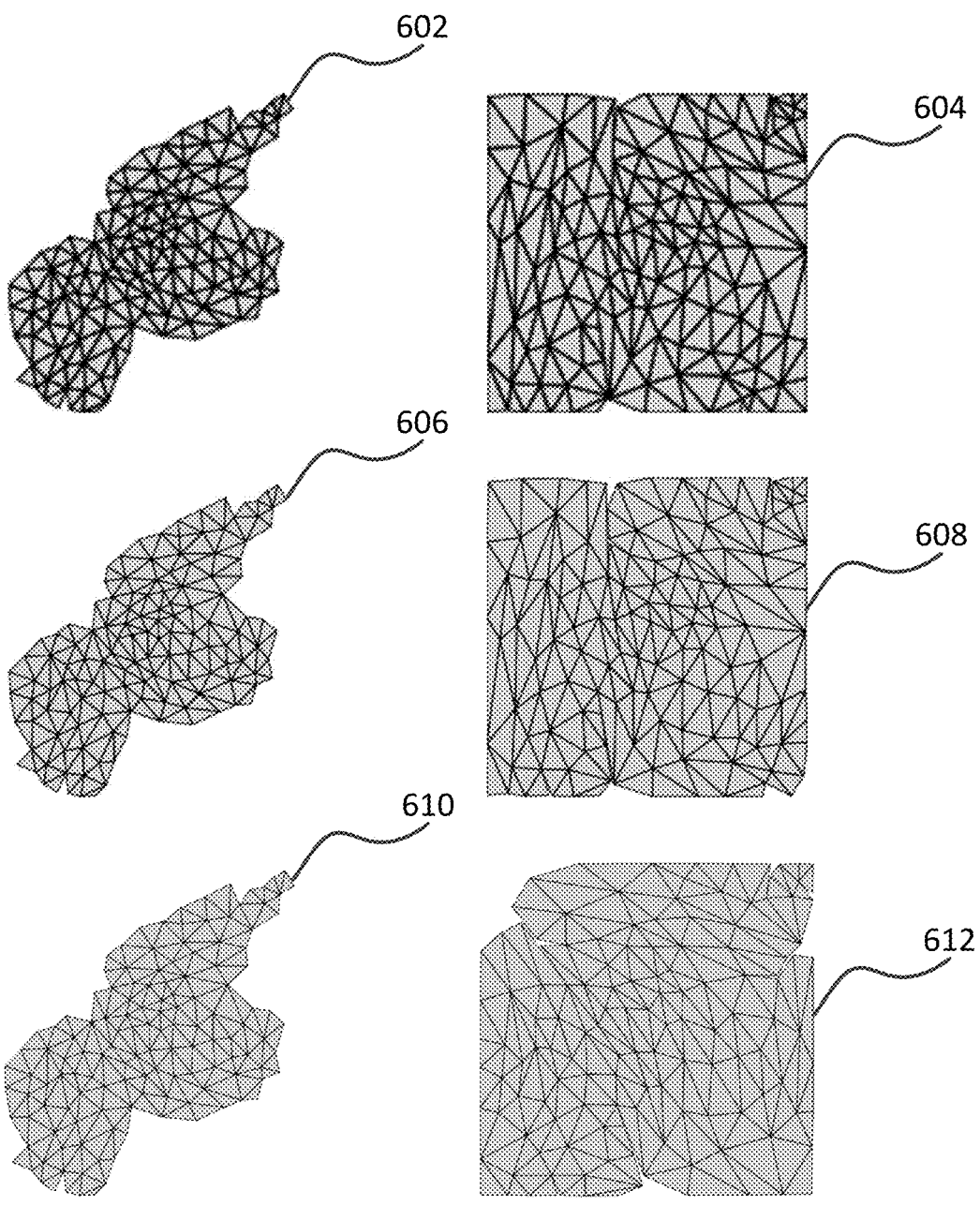
FIG. 6 is an example showing an initial UV and an optimized UV for three different texture resolutions, in accordance with some embodiments of the present disclosure.

As shown in FIG. 6, in some embodiments, the approach described herein is noticeably better by 2-4 PSNR than competing approaches across all datasets. The approach described herein significantly outperforms traditional ray-casting (e.g., 10 PSNR better on some meshes and consistently better on every mesh in the dataset, independent of texture resolution).

On the LOD-3 dataset, where the low-poly model and the high-poly model may have high geometric discrepancies, the approach described herein shows around 3 PSNR improvements compared to NVDiffModeling. On the LOD-2 dataset, with lower geometric discrepancies, the approach described herein may perform even better, achieving around 3.25 PSNR than NVDiffModeling. When the meshes are very similar on the LOD-1 dataset, the approach described herein consistently performs about 3.5 PSNR better than NVDiffModeling, independent of texture resolution. All the reported PSNR improvement is the median improvement over NVDiffModeling, which is outlier resilient and demonstrates a consistent increase. Across texture resolutions, the relative PSNR gain slightly decreases when the texture is tiny, e.g., at a resolution of $128^2$, but increases as resolution increases. Intuitively, this may be because all approaches use a minimal number of texels to encode the high-poly model's appearance.

Figure 5:
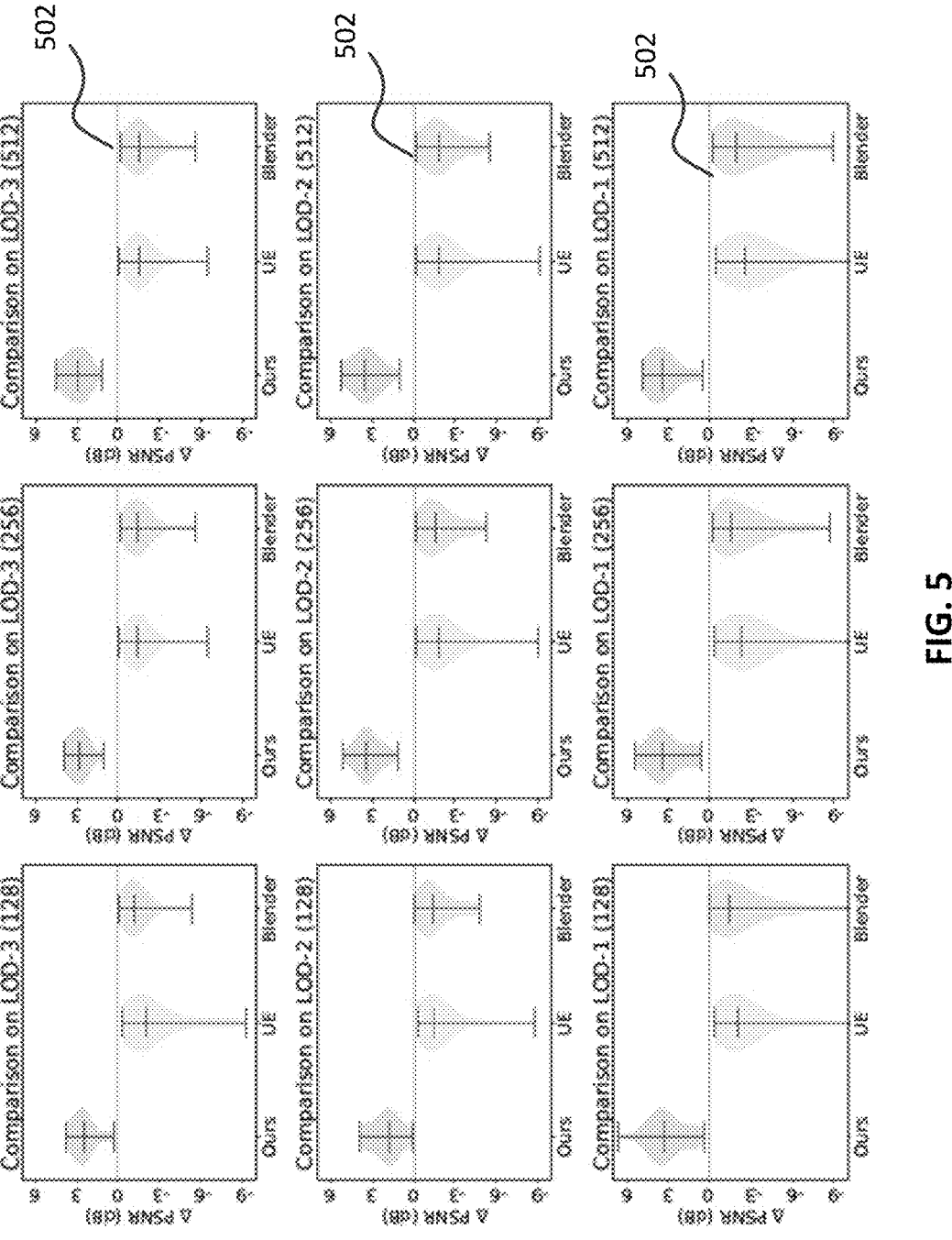
FIG. 5 is an example comparing the described approach relative to other techniques, in accordance with some embodiments of the present disclosure.

FIG. 5 compares the approach that includes UV optimization, SH parallax, and vertex displacements is compared relative to NVDiffModeling (denoted by line 502), and include UE and Blender for reference. In some embodiments, across all texture resolutions and mesh resolutions, the approach described herein may outperform NVDiffModeling significantly. The horizontal line 502 denotes NVDiffModeling (used as the baseline), and the middle marker of the violin plot denotes the median improvement.

In some embodiments, on a single model, multiple levels of detail are compared, alongside the ground truth model and competing methods. In some embodiments, at LOD-1, the approach described herein may have similar performance as NVDiffModeling but may be able to capture finer features around edge borders. Blender also performs well, but UE may have artifacts due to casting the ground onto an object in the model (e.g., a penguin) and the object onto the ground. At LOD-2, the approach described herein retains the visual acuity of LOD-1, whereas the other approaches may become more blurred. Around some regions of the object (e.g., the eyes), UE and NVDiffModeling may begin to blur, significantly degrading the quality.

At the lowest LOD, LOD-3, the approach described herein still appears sharp but has more errors around regions where the low-poly model and high-poly model may have begun to diverge significantly (e.g., some features in the model, such as cracks on the ground may have started to vanish in NVDiffModeling). UE may show artifacts (e.g., feet as a cylinder connected to the ground, which is different from the original model). Across different LOD, the approach described herein preserves sharp features and remains faithful to the original model. In some embodiments, the advantages of the approach described herein at low LOD as compared with NVDiffModeling may be due to SH parallax mapping and vertex displacement. At higher LOD, the advantages of the approach described herein may be due to UV optimization.

In some embodiments, across different texture resolutions (e.g., for LOD-2 of a simple geometric model with a complex texture), the approach described herein maintains key details, whereas other approaches may produce low-poly models that appear blurry or pixelated. In some embodiments, the optimized UV is highly efficient, and may take up almost the entire 0-1 space, whereas the original UV (e.g., initial UV parameterization) does not utilize much texture space.

At the lowest texture resolution in some embodiments (e.g., $128^2$) the approach described herein may have some pixelation artifacts because there may not be sufficient texels to represent the original texture. Even so, the approach described herein may be able to recover some sharp features. NVDiffModeling loses many details, and some regions appear pixelated. UE blurs the features but maintains the general concept, whereas Blender causes pixelization of features.

At the middle texture resolution, (e.g., $256^2$), the approach described herein may reduce some of the blurrings from $128^2$, and capture more precise details. NVDiffModeling may begin to exhibit a higher quality but may still miss many small details, and may have uneven blurring across the surface. The output from UE and Blender both contain artifacts, but where the output from Blender does not have artifacts, the region of the output appears slightly pixelated.

At the highest texture resolution, (e.g., $512^2$), the approach described herein may produce an output that appears very sharp. The output from NVDiffModeling is still unable to recover some details and appears blurry in multiple places. The output from UE may appear very sharp but may have a high discrepancy against the ground truth. Across all resolutions, the approach described herein may have superior visual quality and captures more details.

By having methods to handle varying levels of mesh and texture resolutions, the approach described herein may be robust and may maintain high quality even when the low-poly model and the high-poly model are significantly different.

Comparisons with Content-Aware UV Parameterizations

Existing content-aware UV optimization methods cannot be used to bake textures between meshes with geometric differences, but they may be employed to reduce the texture resolution for a particular model (e.g., the same model). For example, lower resolutions of the textures for the high-poly model may be generated for both 2D and 3D applications.

For 3D comparisons, the approach described herein may be compared with NVDiffModeling and a pipeline of first applying UVAtlas to generate a UV parameterization, then baking textures using NVDiffModeling. To ensure a fair comparison and a bijective initial parameterization for the approach described herein, each high-poly mesh is reparameterized using Blender's smart projection to produce many charts with large margins, which utilizes few texels. This may often produce poor parameterizations but usually generates a bijective mapping. Mappings that are not bijective are cleaned manually, by for example, triangulating, removing degenerate faces, and reparameterizing them as necessary.

Figure 9:
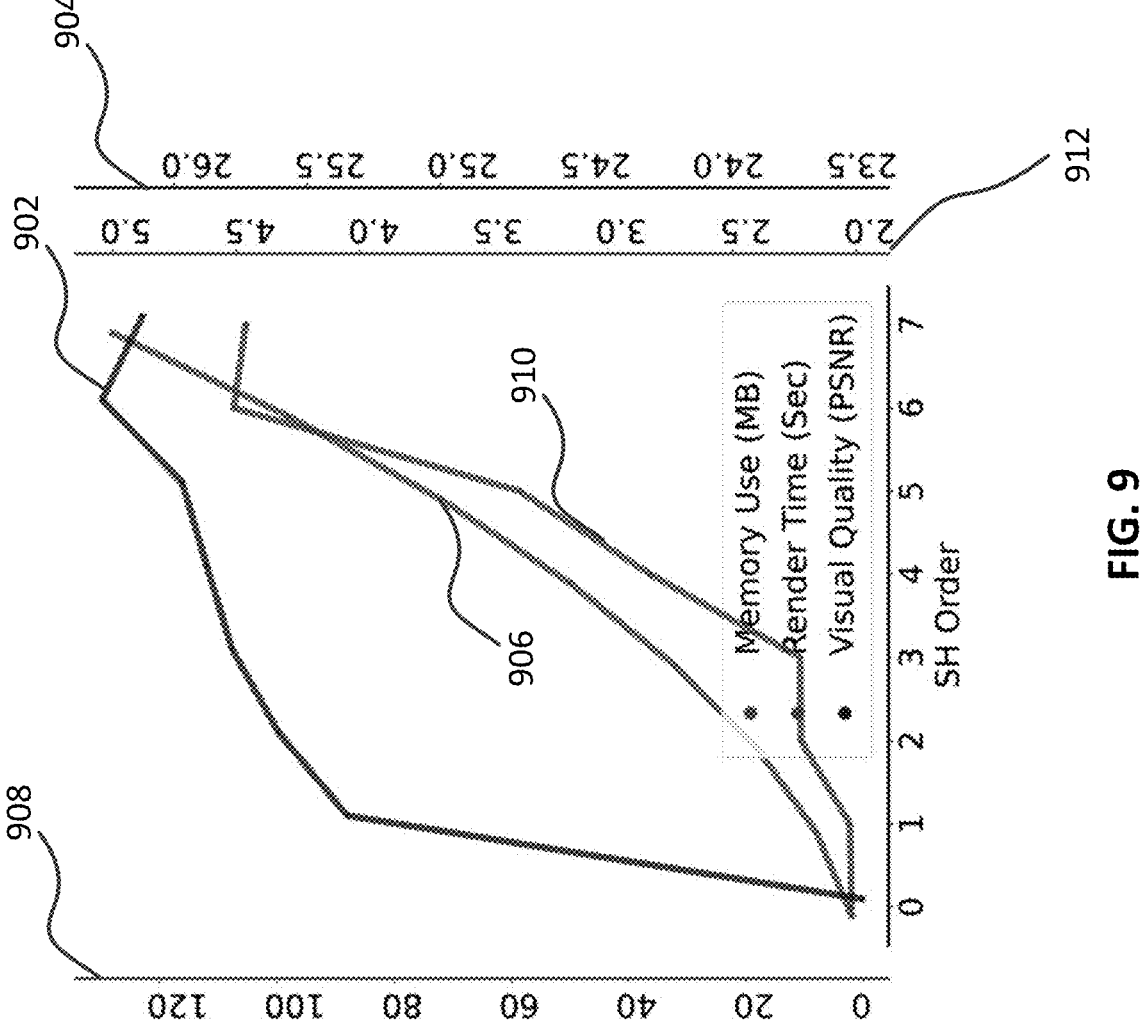
FIG. 9 shows an example of how memory usage, rendering time, and visual quality changes as a function of SH order, in accordance with some embodiments of the present disclosure.

As shown in Table 7 and FIG. 9, UV optimization may provide a performance boost and including SH and vertex displacement may also help reduce the visual differences, despite poor initialization as compared to NVDiffModeling, which uses Simplygon's parameterization. In some embodiments, UVAtlas may perform even worse than only NVDiffModeling, probably because while UVAtlas does not use the full texture space even when it may allocate relatively more texels to important regions, so the absolute number of texels may be less than the number of texels used by the original parameterization.

TABLE 1

|  | Ours | NVDiffModeling | UE | Blender |
|---|---|---|---|---|
| LOD-1 | 35.02/0.994 | 31.23/0.984 | 27.1/0.945 | 29.31/0.971 |
| LOD-2 | 30.17/0.981 | 26.89/0.960 | 24.48/0.916 | 24.89/0.932 |
| LOD-3 | 26.65/0.960 | 24.27/0.931 | 22.94/0.903 | 22.91/0.904 |

Table 1 shows the results of PSNR/MS-SSIM values for multiple levels of details of a model of a penguin, where the number of faces for the high-poly, LOD-1, LOD-2, and LOD-3 are 18163, 2372, 664, and 292, respectively. Independent of LODs, the approach described herein may outperform ray-casting and differentiable rendering approaches, as shown by the higher PSNR/MS-SSIM values across LOD-1, LOD-2, and LOD-3.

FIG. 6 shows comparisons of initial UV 602, 606, and 610, and the respective optimized UV 604, 608, and 612 for each of the three texture resolutions (128, 256, and 512).

Figure 7:
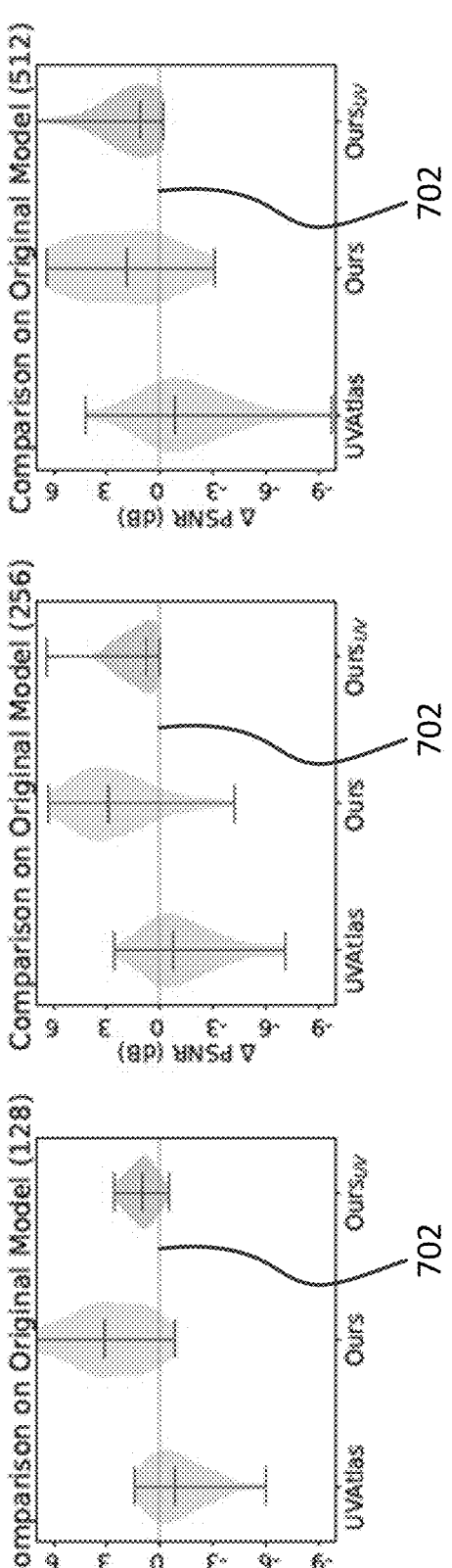
FIG. 7 is an example comparing outputs from different techniques, in accordance with some embodiments of the present disclosure.

FIG. 7 shows PSNR for four techniques. NVDiffModeling (line 702), the approach described herein that includes optimizing texture content, UV parameterization, SH and vertex displacement (Ours), the approach described herein but without SH or vertex displacement (Ours$_{UV}$), and UVAtlas. UVAtlas is first used to generate a UV parameterization, and then NVDiffModeling is used to generate texture contents. The approach described herein (e.g., Ours and Ours$_{UV}$) achieve the best results over all comparisons on down-sampled textures on the original model.

The effectiveness of compressing textures on 2D meshes (e.g., applications in 2D and 2.5D games) is also demonstrated. For 2D models, a UV parameterization which is perfectly isometric to the mesh may be easy to generate, further deforming the UV parameterization may increase visual quality for compressed textures. In some embodiments, a simplified the approach described herein fixes an orthographic camera that can view the entire plane and does not optimize the normal map, SH parallax, or vertex displacements (e.g., in embodiments where the focus may be to recover a compressed texture on the plane). In some embodiments, $L_{UV}$ is set as $1 \times 10^{-5}$.

As shown in FIG. 7, the approach described herein may be able to outperform direct bilinear downsampling, NVDiffModeling, and UVAtlas on a variety of images (e.g., single icon images, paintings, pixel art, game textures, and maps, including those without high-frequency details, or those with extremely high information density). Similar to the approach described herein for 3906D meshes, across all 2D textures at varying target resolutions (three different resolutions are tested), the approach described herein may perform much better than UVAtlas, NVDiffModeling, and direct downsampling, achieving 1 dB, 3 dB, and 3.25 dB more on average over the 2D dataset at $64^2$, $128^2$, and $256^2$ respectively.

Figure 8:
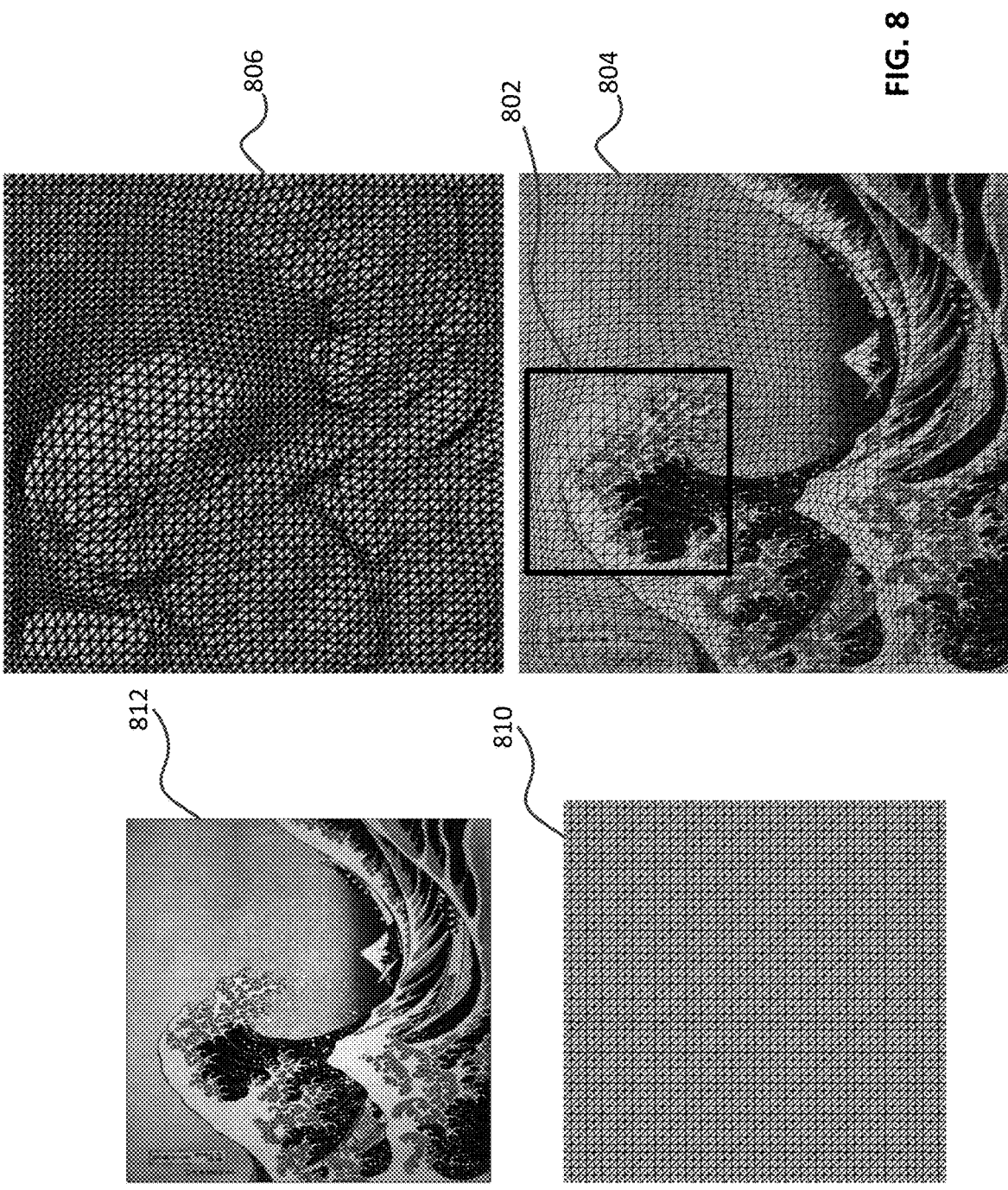
FIG. 8 shows an example of texture compression on planar surfaces by giving regions with higher frequency detail a larger portion of UV space, in accordance with some embodiments of the present disclosure.

The approach described herein is able to compress textures on planar surfaces by giving regions with higher frequency detail a larger portion of UV space, such as the region highlighted by the box 802 on the bottom right image 804 shown in FIG. 8. On the left image of the bottom row is the original UV 810, and the bottom right image 804 is the optimized UV 806 overlaid on top of the original image 812.

Comparison with Other Parallax Mapping Variants. As an alternative to resolving view parallax, the methods and systems described herein can be used to optimize other parallax mapping variants, such as parallax mapping (Parallax), parallax mapping with offset limiting (PMOL), steep parallax mapping (SPM), and parallax occlusion mapping (POM). For SPM and POM, translation is multiplied by a function of depth (depth/#layers), so that it can be optimized jointly alongside a depth map. In some embodiments, third order SH is used for the approach described herein, 16 layers for SPM and POM, and a height scale of $1 \times 10^{-2}$ may be used for all parallax approaches, in some embodiments.

TABLE 2

A comparison of some existing approaches that handle parallax with the approach described herein. Depth (h) and SH are evaluated at a specific texture UV coordinate, and v is the tangent space view direction transformed from the view direction d in the world space. Except for the first two approaches listed in Table 2, it is possible to either include or not include the factor $\frac{1}{v_z}$. POM is based on SPM, but seeks to find a closer approximation to the correct position by using the linear interpolation between the last two steps.

| Method | Formula | #Tex. Fetches |
|---|---|---|
| Parallax Mapping [9] | $UV + v_{xy}\dfrac{h}{v_z}$ | 1 |
| PMOL [40] | $UV + v_{xy}h$ | 1 |
| SPM [22] | $UV_l + v_{xy}\dfrac{h}{k}$ for $h > \dfrac{l}{k}, k \in \mathbb{Z}_+$ | O(N) |

TABLE 2-continued

A comparison of some existing approaches that handle parallax with the
approach described herein. Depth (h) and SH are evaluated at a specific
texture UV coordinate, and v is the tangent space view direction
transformed from the view direction d in the world space. Except for the
first two approaches listed in Table 2, it is possible to either include or not include the factor $\frac{1}{v_z}$. POM is based on SPM, but seeks to find a closer approximation to the correct position by using the linear
interpolation between the last two steps.

| Method | Formula | #Tex. Fetches |
|---|---|---|
| POM [36] | $SPM + Lerp$ | O(N) |
| Ours | $UV + SH(d)\frac{h}{v_z}$ | 1 |

In some embodiments, a minimum of 1000 iterations ($k_1$ in Algorithm 1) is used for optimizing Parallax, PMOL, and SH. In some embodiments, 2500 iterations is used for SPM and POM. On the LOD-3 dataset, the approach described herein may have the best visual quality for reconstructing textures amongst all the parallax variations. Table 3 compares the approach described herein with other variants on a typical example, brick wall, where the high-poly model has a complex geometry and the low-poly model is a cube.

TABLE 3

| | Parallax | PMOL | SPM | POM | Ours$_{SH, V}$ |
|---|---|---|---|---|---|
| PSNR | 19.63 | 21.93 | 21.49 | 23.14 | 24.27 |
| MS-SSIM | 0.791 | 0.877 | 0.867 | 0.904 | 0.924 |

Quantitatively, in some embodiments, the approach described herein may achieve the best PSNR/MS-SSIM evaluations. Qualitatively, in some embodiments, optimizing SH may be able to capture occlusion, which may not be recovered as clearly by optimizing other variants. In addition, the approach described herein may use a single texture fetch, whereas POM and SPM may require multiple fetches for ray marching.

In some embodiments, different parallax variants are applied to the same plane to visualize the difference, and optimize the approach described herein on the same plane. In some embodiments, a high-poly mesh is produced by directly shifting vertices in the opposite direction of the normal by the given depth, and using the original plane to recover the input. In some embodiments, the approach described herein provides a convincing perception of parallax.

Comparison with Displacement Mapping and Mesh Deformation

The approach described herein is compared with two other approaches to reduce the geometry difference between the source and target meshes on the LOD-3 dataset. The two approaches are 1) displacement mapping with 1 level of mesh subdivision that is optimized byNVDiffModeling, and 2) mesh deformation provided in the NVDiff-Modeling. Among the three methods, the approach described herein may be competitive with 1 level of subdivision of the displacement mapping and may perform much better than mesh deformation since NVDiffModeling employs Laplacian term that may often lead to undesirable mesh deformations on most of the models. The subdivision of the displacement mapping may require a significantly different pipeline in practice than the approach described herein, including a geometry shader which is known to be slower than fragment or vertex shaders.

Extensions to Other Texture Maps

The approach described herein works not only for generating diffuse and normal maps, it also works for other kinds of texture maps, such as specular map, which can be achieved by modifying the forward rendering equation to include a specular term. As demonstrated, any map can be generated as long as it is used in the forward rendering equation in a differentiable form. As another example, the example shown in Table 3 also shows that the approach described herein can optimize the depth map for traditional parallax mapping.

Timings

The timings of the approach described herein is compared with NVDiff-Modeling, and the per-iteration cost of the approach described herein is shown in Table 4. First, in some embodiments, it may be essentially cost-free to include vertex optimization on top of UV and parallax mapping optimizations. While NVDiffModeling is mostly independent of texture resolution, the approach described herein may have costs that cost increases with texture size, due to larger memory usage for UV optimization. The approach described herein may also involve more iterations for the UV parameterization prior to convergence. Timings may be machine and implementation dependent, and since the approach described herein may be entirely implemented in Python, it may not have the implementation benefits and compiler optimizations that NVDiffModeling has, as it is mostly a wrapper around a CUDA library. Comparisons with ray-casting are omitted, because here is no "per iteration" cost for ray-casting. Ray-casting approaches may be two orders of magnitude faster and may be the most efficient.

TABLE 4

| Texture Baking Timing (wall-clock) | | | |
|---|---|---|---|
| | Method (Tex. Res) | ms/iter | Iters[†] |
| NV | NV (128) | 245 | 1183 |
| | NV (256) | 242 | 1105 |
| | NV (512) | 244 | 1050 |
| Ours | Ours$_{UV, SH}$ (128) | 448 | 4504 |
| | Ours$_{UV, SH}$ (256) | 450 | 4504 |
| | Ours$_{UV, SH}$ (512) | 607 | 4504 |
| | Ours (512) | 608 | 4504 |
| | Ours$_{SH, V}$ (512) | 486 | 1000 |
| | Ours$_{SH}$ (512) | 507 | 1000 |

The time for performing 1 iteration of optimization for each approach is compared at different texture resolutions in seconds, as well as the number of iterations until convergence. The number of iterations may change per scene and for each approach, and some minimum number of iterations is enforced for the comparison.

Ablation Studies

Vertex Displacement Optimization

In some embodiments, the use of vertex displacement provides better performance as compared to approaches that include only SH and UV optimization. In embodiments that include more significant geometric differences between the low-poly model and the high-poly model (e.g., at LOD-3), the use of vertex displacement may lead to a large increase in performance improvement.

Parallax Mapping

In some embodiments, the use of SH Parallax mapping provides better performance. Across all versions of parallax mapping, texture baking quality may be improved through In some embodiments, the effect of increasing the SH order beyond around order 5 may be negligible, but visible improvement may be seen in orders 0 to 4, as shown in Table 6.

TABLE 6

| | $0^{th}$ order | $1^{st}$ Order | $2^{nd}$ Order | $3^{rd}$ Order | $4^{th}$ Order | $5^{th}$ Order | $6^{th}$ Order | $7^{th}$ Order |
|---|---|---|---|---|---|---|---|---|
| PSNR (dB) | 23.41 | 25.35 | 25.61 | 25.78 | 25.88 | 25.97 | 26.27 | 26.12 | the use of parallax mapping (e.g., universally across all models). SH Parallax has higher final quality compared with other parallax mapping techniques. Parallax mapping may be important in differentiable rendering, such that even standard parallax mapping provides a consistent improvement.

UV Optimization

The importance of UV optimization is highlighted during texture compression, as SH parallax mapping and vertex displacements are not used during the optimization. As shown in FIG. 9, the UV parameterization 906 generated by the approach described herein easily identifies the original image features, and UV optimization has a non-negligible impact on the visual quality.

SH Function Order

In some embodiments, it may not be a priori clear what order of SH provides good quality as there is a tradeoff between universality versus memory requirements and computational cost. In some embodiments, the number of coefficients may be kept as low as possible while providing the highest quality. The rendering quality of varying the order of SH coefficients versus quality on a single mesh is compared as shown in FIG. 9. Visual quality 902 is recorded along axis 904, while render time 910 is recorded along axis 912, and memory use 906 is recorded along axis 908. In some embodiments, there may be a clear correlation between order and quality, and third order SH may be selected as it still has significant visual quality improvements but is not expensive to include in the forward rendering equation.

In some embodiments, the approach described herein is compared against different parallax variants on the same textured mesh with a ground-truth depth map. The output from the approach described herein provides an illusion of depth.

Compared to NVDiffModeling (NV), NVDiffModeling with the vertex optimization enabled (NV$^{\star}$), and 1 level subdivision of the displacement mapping (subdivision) on the same low-poly mesh, the approach described herein may have much better visual quality than NV and NV$^{\star}$ where both blur features on the reconstructed model, and slightly better than subdivision even if it introduces 4 times the number of triangles, as shown in Table 5.

TABLE 5

| | Ours | NV | NV* | Subdivision |
|---|---|---|---|---|
| PSNR | 27.48 | 23.87 | 21.11 | 26.89 |
| MS-SSIM | 0.982 | 0.962 | 0.926 | 0.982 |

The methods and systems described herein may be easily extendible to optimize specular maps. An object may include optimized specular ($T_S$), normal ($T_N$), diffuse ($T_C$), and depth maps ($T_D$). Any map can be optimized if it can be used in a differentiable forward rendering equation.

Different UV Initializations

Figure 10:
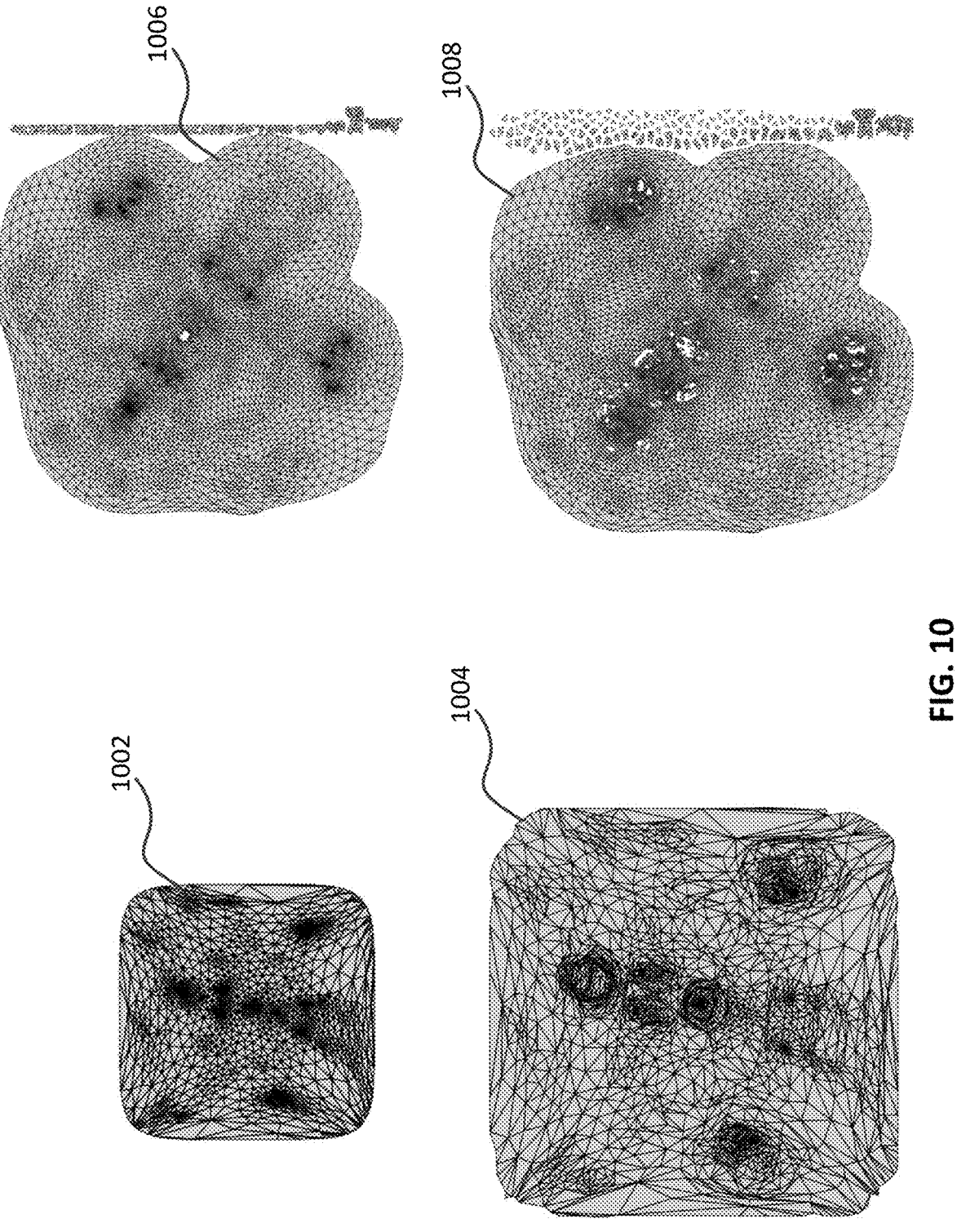
FIG. 10 shows an example of how different UV initializations and their respective optimized UV maps, in accordance with some embodiments of the present disclosure.

The methods and systems described herein are applicable for arbitrary bijective UV mappings, even those with poor initial distortions. As an example, an Ogre model is initialized using the Tutte embedding for the UV parameterization of its low-poly mesh as indicated by 1002 in FIG. 10, and recentered and scaled within bounds (e.g., between 0.25 and 0.75). The Tutte embedding initialization is optimized to be space filling as indicated by 1004. Baking the texture from the original model onto the remeshed version with NVDiffModeling and the approach described herein shows that the approach disclosed herein may recover a higher quality UV embedding that can better represent the texture content. Tutte embedding that further uses that optimization techniques described herein achieves better PSNR as compared to an unoptimized Blender's smart UV unwrapping as indicated by 1006, which is a different UV parameterization. In some embodiments, Blender's smart UV unwrapping initialization introduces additional seams. In some embodiments, the further optimization of Blender's UV unwrapping as indicated in 1008 may allow even better performance to be achieved, as shown in the PSNR/MS-SSIM statistics Table 7 below.

TABLE 7

| Ours w/Tutte Init. Tutte Initialization | | Ours w/Blender Init Blender Initialization | |
|---|---|---|---|
| Ours | 32.17/0.994 | Ours | 33.22/0.995 |
| Ours$_{SH, V}$ | 29.73/0.990 | Ours$_{SH, V}$ | 31.65/0.992 |

FIG. 6 summarizes the results from an experiment in which the left of the figure is optimized textured result from the approach described herein with the Tutte embedding initialization which is optimized to be space filling. For Tutte initialization, there is an increase of about 2.4 PSNR after optimizing UV, and for the Blender initialization, there is an increase of 1.6 PSNR. In some embodiments, by optimizing the initial Tutte parameterization, the approach described herein may outperform the initial Blender UV, and still improves when used on a better parameterization (e.g., Blender initialization). Each component (UV optimization, parallax mapping, and vertex displacement on a single model) of the approach described helps minimize the visual difference between the low-poly model and the high-poly model.

Content-Aware Symmetric Dirichlet $L_{I-UV}$

Table 8 shows how including $L_{I-UV}$ in the objective function improves performance in some embodiments. In some embodiments, using only the image loss $L_{diff}$ to guide UV optimization (e.g., without image-guided UV optimization), gradient information $\partial L/\partial UV$ may not be sufficient to update the UV coordinates. In some embodiments, relying more on $L_{I-UV}$ and less on $L_{UV}$ during optimization may improve performance. In some embodiments, optimizing with only the Symmetric Dirichlet energy and $L_{diff}$ may result in significantly worse performance. In some embodiments, optimizing UV only with $L_{diff}$ alone may not provide sufficient gradient information for the charts to expand.

TABLE 8

| | Ablation of $L_{I\text{-}UV}$ | |
|---|---|---|
| $64 \times 64$ | w/o $L_{I\text{-}UV}$ | w/$L_{I\text{-}UV}$ |
| Cloud | 32.19/0.956 | 33.32/0.960 |
| Item Icons | 21.69/0.907 | 23.77/0.939 |
| Pixel Map | 17.61/0.763 | 18.66/0.808 |
| Painting | 14.19/0.501 | 14.77/0.524 |
| Sea Map | 15.41/0.463 | 16.43/0.593 |
| Rainforest | 25.72/0.962 | 27.82/0.972 |
| Texture 1 | 25.11/0.957 | 28.36/0.967 |
| Texture 2 | 24.66/0.964 | 29.13/0.967 |
| Texture 3 | 26.29/0.982 | 30.93/0.982 |
| Hokusai | 18.70/0.649 | 19.52/0.674 |

In some embodiments, NVDiffmodeling may not accurately capture the sharp details of the original model due to geometric differences. With only third order SH, the low-poly model looks plausible from the front, but there are artifacts on the side. Using an MLP based approach may reduce the number of artifacts on the side, but it may take significantly longer to train, and may requires more resources to use in practice. In some embodiments, increasing the order of SH to 7 may allow it to outperform the MLP, as shown in Table 9 below.

TABLE 9

| Ground Truth, \|V\| = 7816 | NV Diffmodeling \|V\| = 8 | Ours (SH-3) \|[V]\| = 8 | Ours (ML) \|[V]\| = 8 | Ours (SH-7) \|V\| = 8 |
|---|---|---|---|---|
| PSNR | 16.77 | 20.3 | 21.86 | 22.61 |
| MS-SSIM | 0.720 | 0.848 | 0.912 | 0.915 |

The joint optimization formulation described herein combines UV parameterization, view parallax mapping, vertex displacement, and texture-baking. Differentiable rendering is used to optimize a new parallax map and uses optimization techniques (e.g., classic optimization techniques) to ensure bijectivity of UV parameterization. Over a dataset of complex 3D models, combining these components leads to an increase in output visual quality, with little overhead.

The computational cost of optimizing UV coordinates may be quite high, as compared to only baking textures without UV optimization. In some embodiments, re-engineering in CUDA may speed up the global intersection check and line search.

For a low-poly that is significantly different from the high-poly model, SH parallax mapping may introduce "cracks." Due to bounds on frequency for translation functions, these cracks may be inherent, as there may always be some region that it cannot fully capture, but they may not be removed by introducing higher orders of SH or alternative representations such as neural nets. In practice, they will not be visible from a distance. Thus, during practical use, switching LOD may mitigate this issue.

In some embodiments, instead of assuming that cuts imposed by the original parameterization are fixed (e.g., cuts are not optimized jointly with the learned texture map), cut reparameterizations (e.g., OptCuts or other reparameterizations) may be incorporated to the methods and systems described herein to jointly optimize cuts, UV parameterization, and texture.

FIG. 11 is a flow diagram illustrating a method 1100 for optimizing a simplified model associated with a high-poly model (e.g., to improve visual similarity between the low-poly and the high-poly), in accordance with some embodiments of the present disclosure.

At operation 1102, the method includes obtaining information about the simplified model. The information may include an initial UV parameterization (e.g., obtain UV coordinates U on a planar mesh) for the simplified model and an initial set of vertices (e.g., obtain V, a set of vertices in three-dimensional space) of a low-poly mesh.

At operation 1104, the method 1100 includes iteratively updating values of an initialized set of parameters (e.g., $T_N$ (the texture for the normal map), $T_C$ (the texture for the color map), $T_D$ (texture for the scalar depth map), $T_{l,m}$ (texture storing the corresponding coefficients $$Y_l^m$$

for the real Legendre polynomial of order l), and $\Delta V$, a change in positions of the set of vertices V) of the simplified model to obtain optimized values.

At operation 1106, the method 1100 includes updating the initial set of vertices of a low-poly mesh with the optimized values (optimized changes to the set of vertices (e.g., the change in positions of the set of vertices V is added to the current positions of the set of vertices to obtain the updated positions).

At operation 1108, the method 1100 includes optimizing coordinates (e.g., per-texel UV coordinates U) associated with the simplified model based on the optimized values of the initialized set of parameters and the UV parametrization).

At operation 1110, the method 1100 includes baking texture from the high-poly model onto the optimized coordinates to generate the simplified model.

In some embodiments, the information about the simplified model includes coordinates associated with the simplified model (e.g., UV coordinates) for the simplified model and an initial set of vertices of a low-poly mesh. In some embodiments, optimizing the coordinates associated with the simplified model based on the optimized values includes optimizing the coordinates associated with the simplified model based on the optimized values of the initialized set of parameters and the coordinates associated with the simplified model. In some embodiments, iteratively updating the values of the initialized set of parameters includes iteratively updating the values of the initialized set of parameters related to a texture of the simplified model, and the initialized set of parameters comprising changes to an initial set of vertices of a low-poly mesh (e.g., $\Delta V$).

In some embodiments, the low-poly mesh includes a set of vertices, and the low-poly mesh is mapped through a UV parameterization function to a planar mesh. In some embodiments, the texture of the simplified model is obtained by jointly optimizing a texture map and UV coordinates based on a visual metric (e.g., alternatively update the texture content and UV coordinates, which effectively enlarges the solution space for high visual quality). In some embodiments, a visual metric for the whole model from a specific distance is used and the texture content and the UV mapping are jointly optimized to maximize measured visual similarity unlike existing works that only consider optimizing the texture while fixing the given UV parameterization. The approach described herein is the first to jointly optimize UV and texture maps using differentiable rendering, leading to a much larger search space.

In some embodiments, in accordance with a determination that a difference in values (e.g., $\Delta\|T_N\|$, $\Delta|T_C|$) of a first parameter of the initialized set of parameters between a first iteration and a second iteration satisfies a first threshold ($\Delta\|T_N\|$, $\Delta|T_C|)>\varepsilon_1$): optimizing the values of the initialized set of parameters while keeping coordinates associated with the simplified model constant (e.g., fix U, and update $T_N$, $T_C$, $T_D$, $T_{l,m}$, and $\Delta V$), and optimizing the coordinates associated with the simplified model while keeping the values of the initialized set of parameters constant (e.g., fix $T_N$, $T_C$, $T_D$, $T_{l,m}$, and $\Delta V$, update U).

In some embodiments, the method further includes shifting UV coordinates based on a view direction for view parallax mapping (e.g., Spherical Harmonic (SH) Parallax mapping using a SH texture map to store coefficients for nonlinear Spherical Harmonic functions. The SH map is optimized jointly with the UV and texture maps to minimize the visual differences. In some embodiments, the method further includes shifting UV coordinates based on a view direction for view parallax mapping. In some embodiments, the method further includes adding parallax mapping to planar surfaces to add depth-parallax by shifting texture coordinates in a UV space, corresponding to a depth of a corresponding element. In some embodiments, the method further includes incorporating appearance attributes to obtain the optimized values. In some embodiments, the method further includes varying a level of detail of the simplified model based on a viewpoint of a user (e.g., using low-poly for low LOD, and/or high poly for high resolution.).

The techniques, described above, can be implemented as computer software using computer-readable instructions and physically stored in one or more computer-readable media. For example, FIG. 12 shows a computer system 1200 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
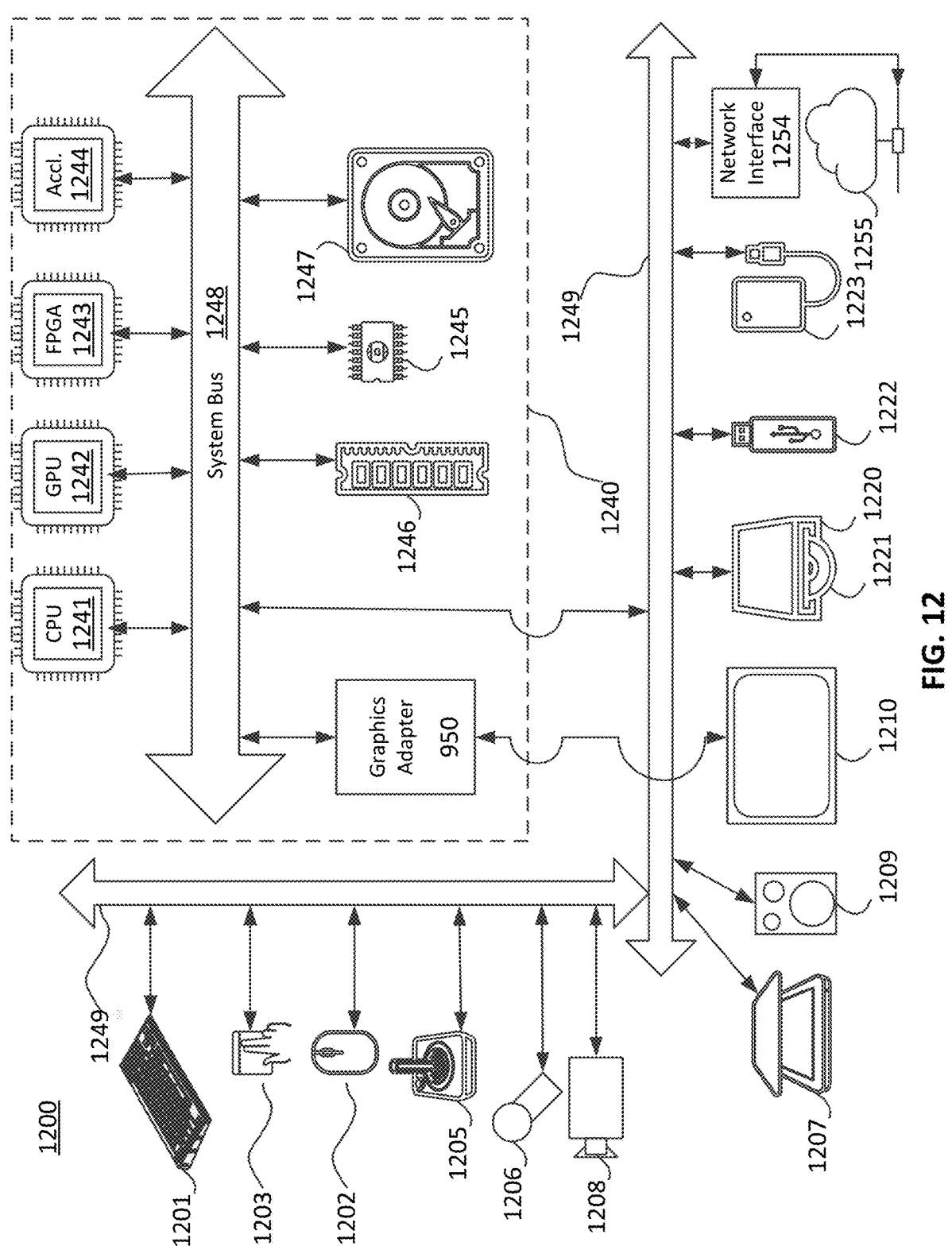
FIG. 12 is a diagram of a computer system suitable for implementing some embodiments of the present disclosure.

The components shown in FIG. 12 for computer system 1200 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, data-glove, joystick 1205, microphone 1206, scanner 1207, camera 1208.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, data glove, or joystick 1205, but there can also be tactile feedback devices that do not serve as input devices). For example, such devices may be audio output devices (such as: speakers 1209, headphones (not depicted)), visual output devices (such as screens 1210 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD or the like media 1221, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1249 (such as, for example USB ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1255. Certain protocols and protocol stacks can be used on each of those networks and network interfaces as described above.

Aforementioned human interface devices, human-accessible storage devices, and network interfaces 1254 can be attached to a core 1240 of the computer system 1200.

The core 1240 can include one or more Central Processing Units (CPU) 1241, Graphics Processing Units (GPU) 1242, specialized programmable processing units in the form of Field Programmable Gate Areas (FPGA) 1243, hardware accelerators for certain tasks 1244, and so forth. These devices, along with Read-only memory (ROM) 1245, Random-access memory 1246, internal mass storage such as internal non-user accessible hard drives, SSDs, and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1249. Architectures for a peripheral bus include PCI, USB, and the like. A graphics adapter 1250 may be included in the core 1240.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieve to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method of optimizing a simplified model associated with a high-poly model performed at a computing system having memory and one or more processors, the method comprising:

obtaining, at the computing system, information about the simplified model;

iteratively updating, using the one or more processors of the computing system, values of an initialized set of parameters of the simplified model to obtain optimized values;

in accordance with a determination that a difference in values of a first parameter of the initialized set of parameters between a first iteration and a second iteration satisfies a first threshold:

optimizing the values of the initialized set of parameters while keeping constant coordinates associated with the simplified model, and optimizing the coordinates associated with the simplified model while keeping constant the values of the initialized set of parameters;

updating a low-poly mesh with the optimized values;

optimizing, using the one or processors of the computing system, the coordinates associated with the simplified model based on the optimized values;

baking texture from the high-poly model onto the optimized coordinates to generate the simplified model.

2. The method of claim 1, wherein the information about the simplified model includes the coordinates associated with the simplified model and an initial set of vertices of the low-poly mesh.

3. The method of claim 2, wherein optimizing the coordinates associated with the simplified model based on the optimized values includes optimizing the coordinates associated with the simplified model based on the optimized values of the initialized set of parameters and the coordinates associated with the simplified model.

4. The method of claim 1, wherein iteratively updating the values of the initialized set of parameters includes iteratively updating the values of the initialized set of parameters related to a texture of the simplified model, and the initialized set of parameters comprising changes to an initial set of vertices of the low-poly mesh.

5. The method of claim 4, wherein the low-poly mesh comprises a set of vertices, and the low-poly mesh is mapped through a UV parameterization function to a planar mesh.

6. The method of claim 4, wherein the texture of the simplified model is obtained by jointly optimizing a texture map and the coordinates associated with the simplified model based on a visual metric, and wherein the coordinates associated with the simplified model comprise UV coordinates.

7. The method of claim 6, further comprising shifting UV coordinates based on a view direction for view parallax mapping.

8. The method of claim 7, further comprising adding parallax mapping to planar surfaces to add depth-parallax by shifting texture coordinates in a UV space, corresponding to a depth of a corresponding element.

9. The method of claim 1, further including incorporating appearance attributes to obtain the optimized values.

10. The method of claim 1, further including varying a level of detail of the simplified model based on a viewpoint of a user.

11. An electronic device, comprising:
one or more processors; and
memory storing one or more programs, the one or more programs comprising instructions that, when executed by the one or more processors, cause the one or more processors to perform operations comprising:
obtaining information about a simplified model associated with a high-poly model;
iteratively updating values of an initialized set of parameters of the simplified model to obtain optimized values;
in accordance with a determination that a difference in values of a first parameter of the initialized set of parameters between a first iteration and a second iteration satisfies a first threshold:
optimizing the values of the initialized set of parameters while keeping constant coordinates associated with the simplified model, and optimizing the coordinates associated with the simplified model while keeping constant the values of the initialized set of parameters;
updating a low-poly mesh with the optimized values;
optimizing the coordinates associated with the simplified model based on the optimized values; and
baking texture from the high-poly model onto the optimized coordinates to generate the simplified model.

12. The electronic device of claim 11, wherein the information about the simplified model includes coordinates associated with the simplified model for the simplified model and an initial set of vertices of a low-poly mesh.

13. The electronic device of claim 11, wherein iteratively updating the values of the initialized set of parameters includes iteratively updating the values of the initialized set of parameters relating to a texture of the simplified model, and the initialized set of parameters comprises changes to an initial set of vertices of the low-poly mesh.

14. The electronic device of claim 13, wherein the low-poly mesh comprises a set of vertices, and the low-poly mesh is mapped through a UV parameterization function to a planar mesh.

15. The electronic device of claim 13, wherein the texture of the simplified model is obtained by jointly optimizing a texture map and UV coordinates based on a visual metric.

16. A non-transitory computer-readable storage medium, storing a computer program, the computer program, when executed by one or more processors of an electronic device, cause the one or more processors to perform operations comprising:
obtaining information about a simplified model associated with a high-poly model;
iteratively updating values of an initialized set of parameters of the simplified model to obtain optimized values;
in accordance with a determination that a difference in values of a first parameter of the initialized set of parameters between a first iteration and a second iteration satisfies a first threshold:
optimizing the values of the initialized set of parameters while keeping constant coordinates associated with the simplified model, and optimizing the coordinates associated with the simplified model while keeping constant the values of the initialized set of parameters;
updating a low-poly mesh with the optimized values;
optimizing the coordinates associated with the simplified model based on the optimized values; and
baking texture from the high-poly model onto the optimized coordinates to generate the simplified model.

17. The non-transitory computer-readable storage medium of claim 16, wherein iteratively updating the values of the initialized set of parameters includes iteratively updating the values of the initialized set of parameters relating to a texture of the simplified model, and the initialized set of parameters comprises changes to an initial set of vertices of the low-poly mesh.

* * * * *